(12) United States Patent
Morita et al.

(10) Patent No.: US 10,079,867 B2
(45) Date of Patent: Sep. 18, 2018

(54) APPARATUS, SYSTEM, AND METHOD OF CONTROLLING OUTPUT OF CONTENT DATA, AND RECORDING MEDIUM

(71) Applicants: Kenichiro Morita, Tokyo (JP); Takuya Imai, Tokyo (JP); Shoh Nagamine, Kanagawa (JP); Hideki Shiro, Kanagawa (JP)

(72) Inventors: Kenichiro Morita, Tokyo (JP); Takuya Imai, Tokyo (JP); Shoh Nagamine, Kanagawa (JP); Hideki Shiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 276 days.

(21) Appl. No.: 15/040,485

(22) Filed: Feb. 10, 2016

(65) Prior Publication Data
US 2016/0277462 A1    Sep. 22, 2016

(30) Foreign Application Priority Data

Mar. 18, 2015   (JP) .................................. 2015-054646

(51) Int. Cl.
| | | |
|---|---|---|
| G06F 15/167 | (2006.01) | |
| H04L 29/06 | (2006.01) | |
| H04M 3/56 | (2006.01) | |
| H04N 7/14 | (2006.01) | |
| H04N 7/15 | (2006.01) | |

(52) U.S. Cl.
CPC ...... *H04L 65/4038* (2013.01); *H04L 65/1069* (2013.01); *H04M 3/567* (2013.01); *H04N 7/147* (2013.01); *H04N 7/15* (2013.01)

(58) Field of Classification Search
CPC .................. H04L 65/4038; H04L 65/1069
USPC .......................... 709/204, 200, 226, 220, 217
See application file for complete search history.

(56) References Cited

U.S. PATENT DOCUMENTS

| | | | | |
|---|---|---|---|---|
| 6,816,967 | B1 * | 11/2004 | Iijima .............. | G11B 20/00086 336/94 |
| 2004/0022322 | A1 | 2/2004 | Dye | |

(Continued)

FOREIGN PATENT DOCUMENTS

| | | |
|---|---|---|
| JP | 2007-197154 | 8/2007 |
| JP | 2010-258850 | 11/2010 |

(Continued)

OTHER PUBLICATIONS

Extended European Search Report dated Aug. 17, 2016 in Patent Application No. 16158621.9.

*Primary Examiner* — El Hadji Sall
(74) *Attorney, Agent, or Firm* — Oblon, McClelland, Maier & Neustadt, L.L.P.

(57) ABSTRACT

The communication terminal determines whether a delay in output of an output signal based on first content data is detected, the first content data being received from a first counterpart communication terminal through a network, generates a first request for changing a code quantity of the first content data being received based on a determination indicating that the delay is detected, the first request including a reduction coefficient for determining an amount of reduction in the code quantity of the first content data being received, and transmits the first request to the first counterpart communication terminal that transmits the first content data, through the network.

15 Claims, 18 Drawing Sheets

(56) References Cited

U.S. PATENT DOCUMENTS

| | | |
|---|---|---|
| 2004/0268134 A1* | 12/2004 | Sasaki .................. G06F 21/123 |
| | | 713/187 |
| 2005/0213843 A1* | 9/2005 | Nojima .................. G06T 5/009 |
| | | 382/274 |
| 2007/0091815 A1 | 4/2007 | Tinnakornsrisuphap et al. |
| 2016/0219248 A1 | 7/2016 | Reznik et al. |

FOREIGN PATENT DOCUMENTS

| | | |
|---|---|---|
| WO | WO 2015/031780 A1 | 3/2015 |
| WO | WO 2015/133216 A1 | 9/2015 |

* cited by examiner

FIG. 7

| TERMINAL ID | TERMINAL NAME | OPERATING STATE | DATE/TIME RECEIVED | IP ADDRESS |
|---|---|---|---|---|
| aaa | Company X Tokyo HQ Terminal 1 | Online (Communication OK) | 2014.11.10.13:40 | 1.2.1.3 |
| aab | Company X Tokyo HQ Terminal 2 | Online (Communication OK) | 2014.11.10.12:00 | 1.2.1.4 |
| aac | Company X Tokyo HQ Terminal 3 | Offline | 2014.11.09.12:40 | 1.2.1.5 |
| ... | ... | ... | ... | ... |
| bbb | Company X Osaka Branch Terminal 1 | Online (Communicating) | 2014.11.10.13:45 | 1.2.2.3 |
| bbc | Company X Osaka Branch Terminal 2 | Offline | 2014.11.10.10:30 | 1.2.2.4 |
| bbd | Company X Osaka Branch Terminal 3 | Online (Communication OK) | 2014.11.10.13:50 | 1.2.2.5 |
| ... | ... | ... | ... | ... |
| ccc | Company Y Osaka Sales Dept. Terminal 1 | Offline | 2014.11.09.11:25 | 1.2.3.3 |
| ccd | Company Y Osaka Sales Dept. Terminal 2 | Online (Interrupted) | 2014.11.10.12:45 | 1.2.3.4 |
| cce | Company Y Osaka Sales Dept. Terminal 3 | Online (Communication OK) | 2014.11.10.12:45 | 1.2.3.5 |
| ... | ... | ... | ... | ... |

FIG. 8

| | 504 |
|---|---|
| REQUEST TERMINAL (TERMINAL ID) | COUNTERPART TERMINAL (TERMINAL ID) |
| aaa | aab, aac, ddd, ⋯ ⋯ ,eee, eef, ⋯ |
| aab | aaa, aac, ddd, ⋯ ⋯ ,eee, eef, ⋯ |
| aac | aaa, aab, ddd, ⋯ ⋯ ,eee, eef, ⋯ |
| ⋮ | ⋮ |
| bbb | bbc, bbd, ccf, ⋯ ⋯ ,ggg, ggh, ⋯ |
| bbc | bbb, bbd, ccf, ⋯ ⋯ ,ggg, ggh, ⋯ |
| bbd | bbb, bbc, ccf, ⋯ ⋯ ,ggg, ggh, ⋯ |
| ⋮ | ⋮ |
| ccc | ccd, cce, ggj, ⋯ ⋯ ,kkk, kkl, ⋯ |
| ccd | ccc, cce, ggj, ⋯ ⋯ ,kkk, kkl, ⋯ |
| cce | ccc, ccd, ggj, ⋯ ⋯ ,kkk, kkl, ⋯ |
| ⋮ | ⋮ |

FIG. 10

| CONTACT LIST | | |
|---|---|---|
| Online (Communication OK) | aab | Company X Tokyo HQ Terminal 2 |
| Offline | aac | Company X Tokyo HQ Terminal 3 |
| Online (Communication OK) | ddd | Company X Tokyo HQ Terminal 4 |
| Online (Communicating) | aae | Company X Tokyo HQ Terminal 5 |
| Offline | aaf | Company X Tokyo HQ Terminal 6 |
| Offline | aag | Company X Tokyo HQ Terminal 7 |

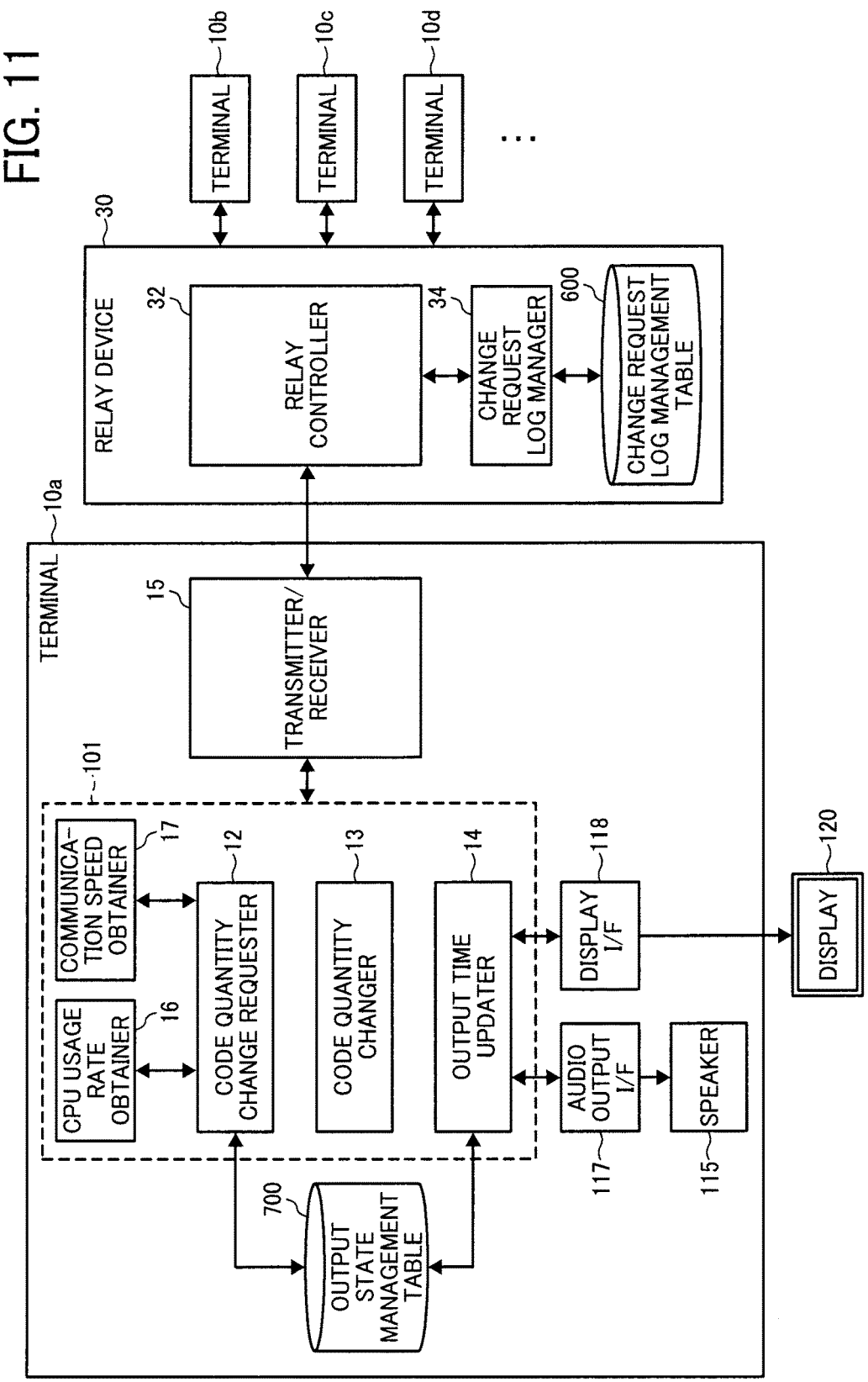

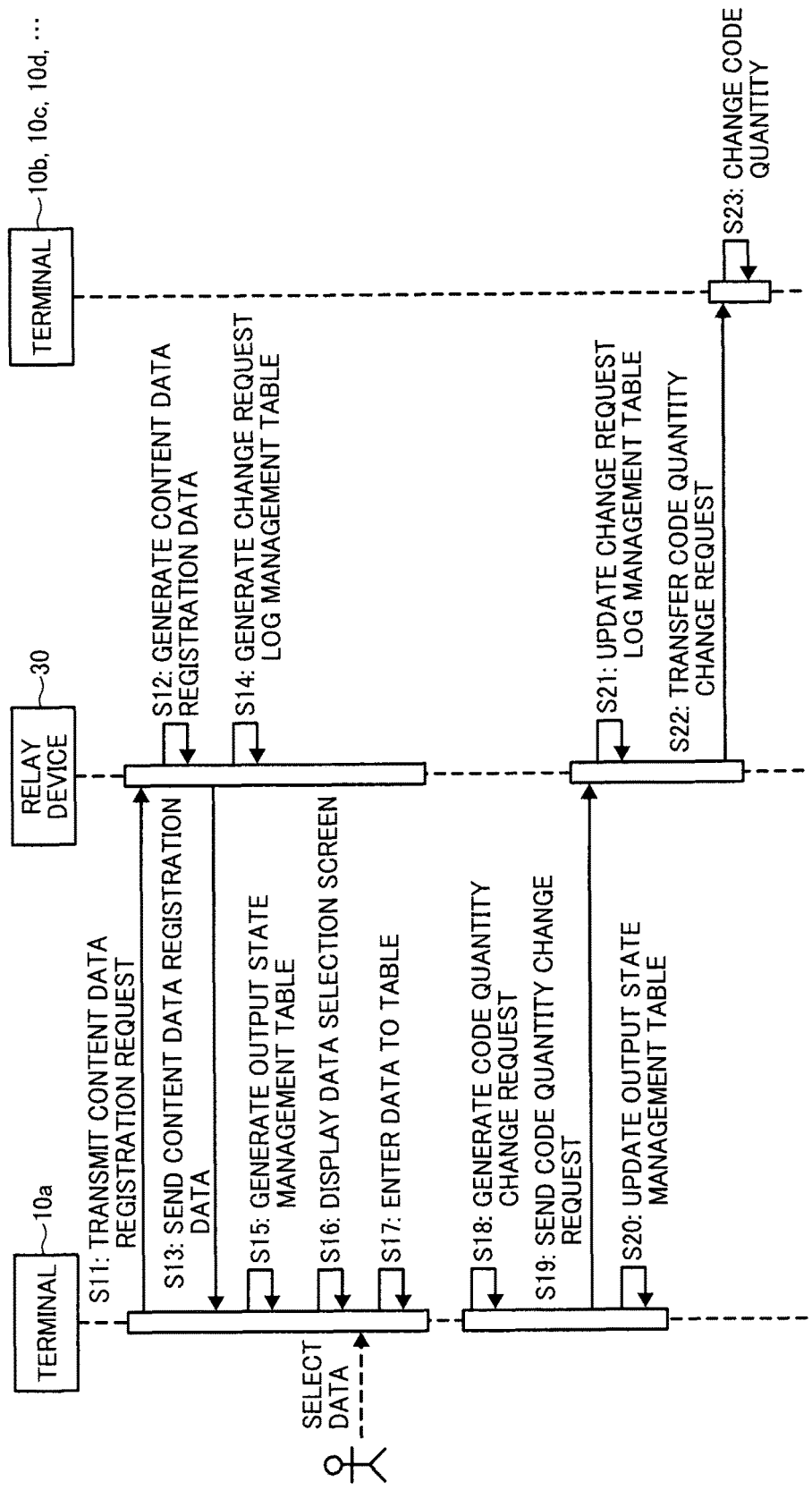

APPARATUS, SYSTEM, AND METHOD OF CONTROLLING OUTPUT OF CONTENT DATA, AND RECORDING MEDIUM

CROSS-REFERENCE TO RELATED APPLICATIONS

This patent application is based on and claims priority pursuant to 35 U.S.C. § 119(a) to Japanese Patent Application No. 2015-054646, filed on Mar. 18, 2015, in the Japan Patent Office, the entire disclosure of which is hereby incorporated by reference herein.

BACKGROUND

Technical Field

The present invention relates to an apparatus, system, and method of controlling output of content data, and a recording medium storing a control program.

Description of the Related Art

As an example of system for sharing image data and audio data among a plurality of sites through a communication network, remote conference systems such as a videoconference system have been widely used. Such remote conference systems may sometimes suffer from delay in output of content data such as due to the trouble in communication network. If delay in output of content data occurs, the participants would not be able to exchange information smoothly.

SUMMARY

Example embodiments of the present invention include a communication terminal, which determines whether a delay in output of an output signal based on first content data is detected, the first content data being received from a first counterpart communication terminal through a network, generates a first request for changing a code quantity of the first content data being received based on a determination indicating that the delay is detected, the first request including a reduction coefficient for determining an amount of reduction in the code quantity of the first content data being received, and transmits the first request to the first counterpart communication terminal that transmits the first content data, through the network.

Example embodiments of the present invention include a communication terminal, which further reduces a code quantity of second content data according to a reduction coefficient of a second request for changing a code quantity of the second content data to be transmitted to a second counterpart communication terminal from the second communication terminal.

Example embodiments of the present invention include a relay device that relays content data between the communication terminal and one or more counterpart communication terminals. The relay device stores in a memory request information associating an identifier identifying each one of a plurality of items of content data being relayed and one or more requests for changing a code quantity of the content data that are received from the one or more of the plurality of communication terminals for the content data; and updates the request information so as to include the first request in response to receiving the first request for changing a code quantity of the first content data.

Example embodiments of the present invention include a communication system including two or more of the above-described communication terminals and the relay device.

The communication system may further include a management apparatus that manages communication among the counterpart communication terminals.

Example embodiments of the present invention include a method performed by the communication terminal, the relay device, and the management apparatus, and a recording medium storing a control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an illustration of an example data structure of a terminal management table;

FIG. 8 is an illustration of an example data structure of a contact list management table;

FIG. 10 is an illustration of an example contact list;

FIG. 11 is a schematic block diagram illustrating a functional configuration of the communication terminal and the relay device of FIG. 1, according to an embodiment of the present invention;

FIG. 12 is a data sequence diagram illustrating operation of processing a request for changing code quantity, performed by the communication system of FIG. 1, according to an embodiment of the present invention;

Figure 1:
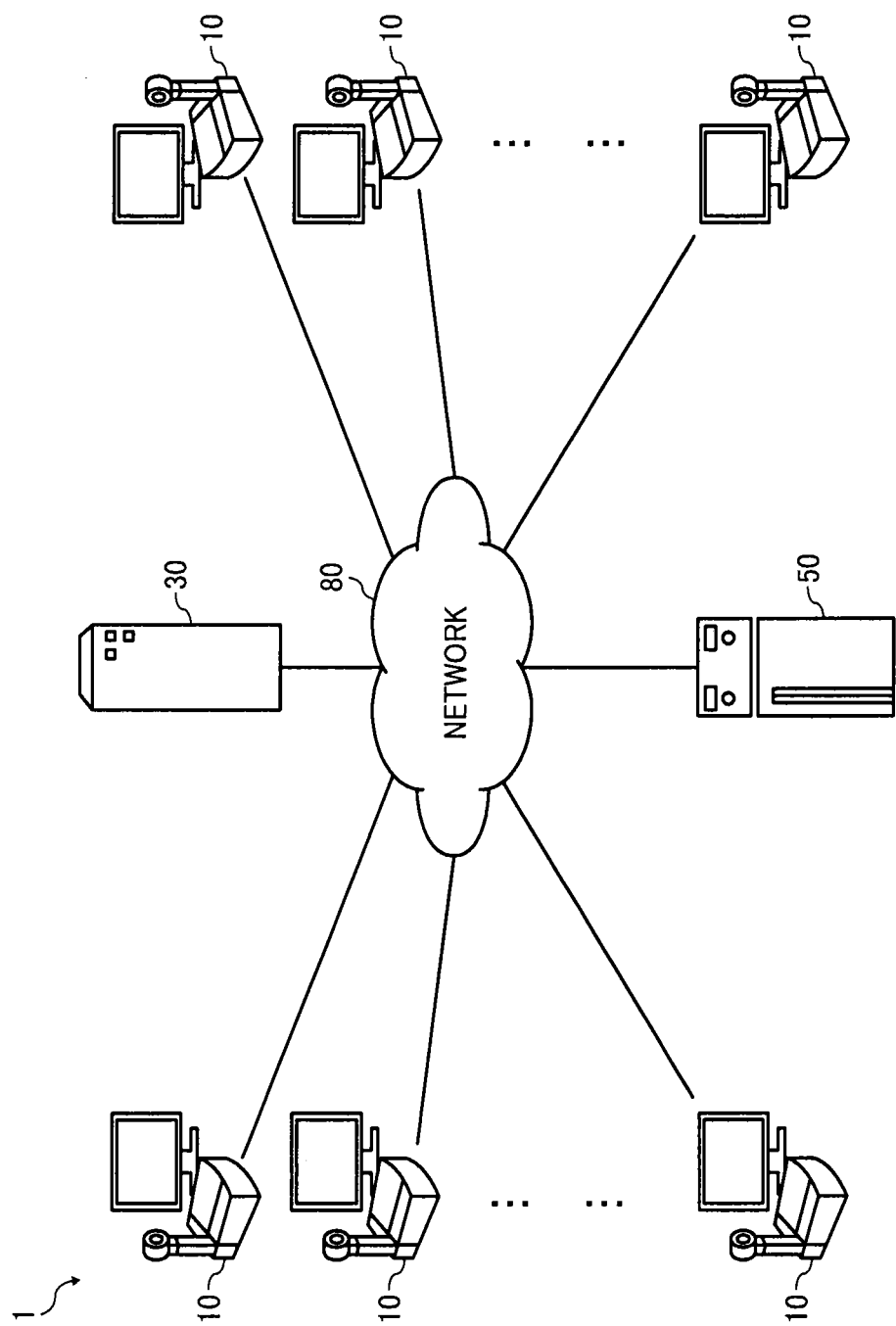
FIG. 1 is a schematic block diagram illustrating a configuration of a communication system, according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following, a remote conference system 1 is described as an example of a communication system according to an embodiment of the present invention.

FIG. 1 is a schematic block diagram illustrating a network configuration of the remote conference system 1 according to the embodiment of the present invention. The remote conference system 1 includes a plurality of communication terminals 10 (10a, 10b, 10c . . . ), at least one relay device 30, and a communication management apparatus 50, which are connected through a communication network 80 such as the Internet or local area network (LAN) so as to be communicable with each other.

For simplicity, any arbitrary one(s) of the communication terminals 10 may be referred to as the terminal 10. The communication management apparatus 50 may be simply referred to as the management apparatus 50.

The terminal 10 in this embodiment may be implemented by any communication device capable of communicating with the other terminal through a network, such as a videoconference communication terminal, an information processing apparatus such as a general-purpose computer, a portable phone, etc.

The terminal 10 transmits image data or audio data, which is obtained at a local site, to a counterpart terminal 10 at the other site for output at the other site. The terminal 10 further receives image data or audio data, from the counterpart terminal 10 at the other site for output at the terminal 10. In this embodiment, through transmission or reception of image data and audio data, which may be collectively referred to as content data, videoconference can be carried out among the plurality of terminals 10.

The relay device 30 relays content data between at least two terminals 10.

The management apparatus 50 performs various processing to control the entire system, such as authenticating the terminal 10 for login or monitoring network communication state. The management apparatus 50 centrally manages various management information for controlling the system 1.

Figure 2:
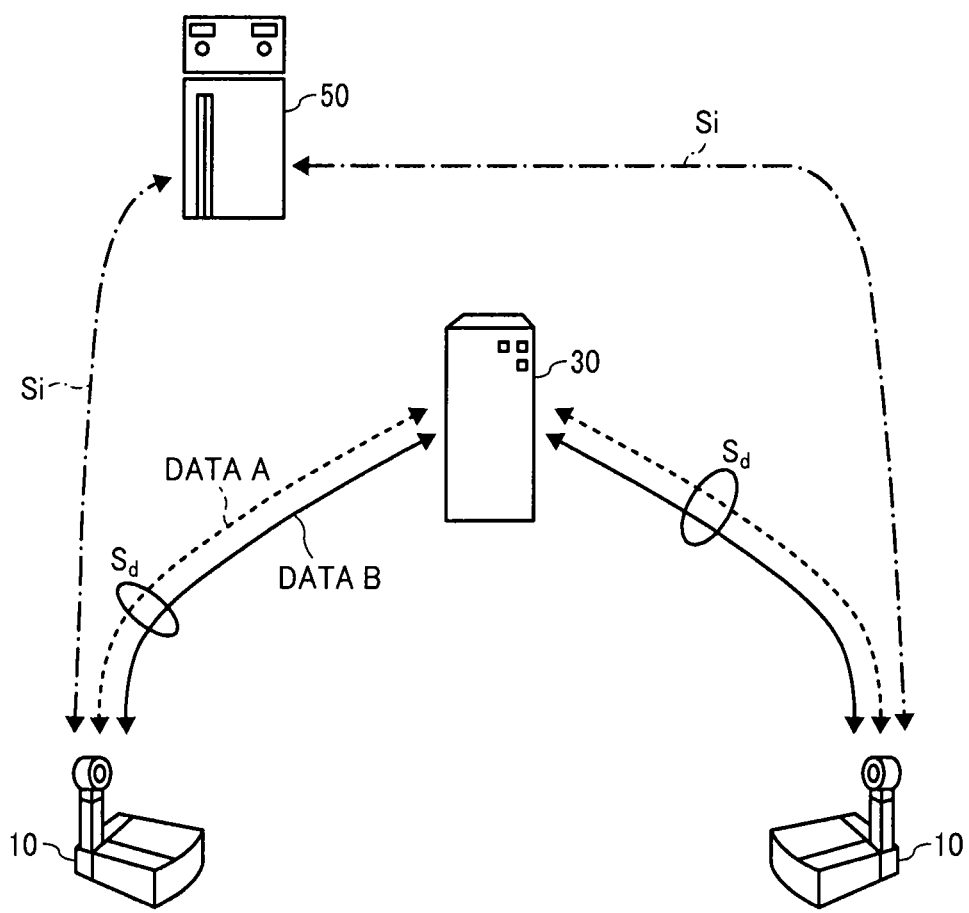
FIG. 2 is a conceptual diagram illustrating transmission or reception of content data in the communication system of FIG. 1, according to the embodiment of the present invention.

FIG. 2 is a conceptual diagram for explaining transmission or reception of content data in the remote conference system 1. In this embodiment, the terminal 10 and the management apparatus 50 establish a management information session Si to transmit or receive various management information therebetween. Further, in this embodiment, the relay device 30 establishes a content data session Sd with each terminal 10 to transmit or receive content data between the terminals 10 that are communicating. More specifically, through establishing a content data session Sd with each terminal 10, the relay device 30 is able to transmit content data for the plurality of terminals 10 concurrently.

The content data in this example may be image data (video or still image), audio data, and/or text data. For example, referring to FIG. 2, the terminal 10 may transmit image data (data A) and audio data (data B), to the counterpart terminal 10 through the content data session Sd.

Now, a configuration of each apparatus in the remote conference system 1 is described according to the embodiment of the present invention.

Figure 3:
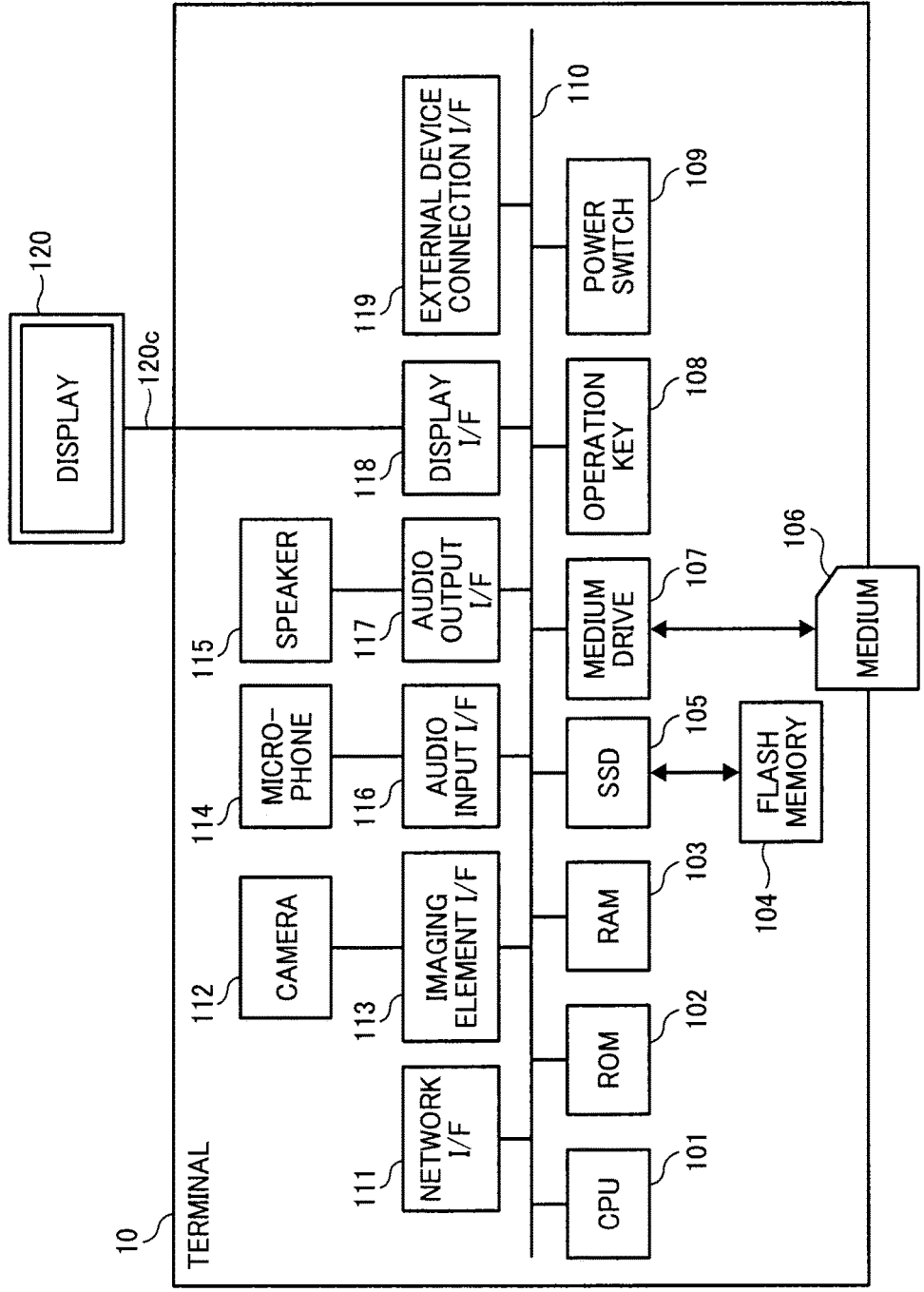
FIG. 3 is a schematic block diagram illustrating a hardware configuration of a communication terminal of the communication system of FIG. 1.

Referring to FIG. 3, a hardware configuration of the terminal 10 is described according to the embodiment of the present invention. As illustrated in FIG. 1, the terminal 10 includes a central processing unit (CPU) 101 that controls entire operation of the terminal 10, a read only memory (ROM) 102 that stores a control program for controlling operation of the CPU 101 such as an initial program loader (IPL), a random access memory (RAM) 103 that works as a work area for the CPU 101, a flash memory 104 that stores various data such as image data or audio data, a solid state drive (SSD) 105 that controls reading or writing of various data with respect to the flash memory 104 under control of the CPU 101, a medium drive 107 that controls reading or writing of various data with respect to a recording medium 106 such as a flash memory, an operation key 108 for inputting a user instruction such as selection of a counterpart for the terminal 10, a power switch 109 for switching on or off of the terminal 10, a network interface (I/F) 111 to control transmission of data through the communication network 80, and a bus line 110 for connecting various elements of the terminal 10 such as an address bus or a data bus.

In this example, any one of the operation key 108 and the power switch 109 is an example of an input device for inputting a user instruction.

The terminal 10 further includes an image capturing device that captures scenery during the conference to obtain image data for transmission to the counterpart terminal 10, which may be implemented by as a built-in camera 112 including a lens optical system and a solid-state imaging element. As the solid-state imaging element, a complementary metal-oxide-semiconductor (CMOS) or a charge-coupled device (CCD) may be used. The terminal 10 further includes an imaging element I/F 113 that controls driving of the camera 112.

The terminal 10 is connected to an external display 120, which is an example of image output device, through a cable 120c. The display 120 displays an image of the other site during conference or an operation input screen, based on an image signal such as a video graphic array (VGA)) signal, a high-definition multimedia interface (HDMI) signal, or a digital video interactive (DVI) signal, which is output from a display I/F 118. Alternatively, the display 120 may be a built-in display.

The terminal 10 further includes a built-in microphone 114, as an example of audio input device, and an audio input I/F 116. The audio input I/F 116, which controls an audio signal input through the microphone 114. The terminal 10 further includes a built-in speaker 115, as an example of audio output device, and an audio output I/F 117. The speaker 115 outputs audio collected at the other site during conference and received from the other site, based on an audio signal output from the audio output I/F 117.

In this disclosure, any one of the display I/F 118 and the audio output I/F 117 is an example of an output I/F that controls output of a signal generated based on content data through an output device.

The terminal 10 further includes an external device connection I/F 119 capable of connecting with various external devices. The external device connection I/F 119 may be connected through a USB cable to an external camera, external microphone, or external speaker. In the case where the external camera is connected, the external camera is driven in preference to the built-in camera 112 under control of the CPU 101. Similarly, in the case where the external microphone is connected or the external speaker is connected, the external microphone or the external speaker is driven in preference to the built-in microphone 114 or the built-in speaker 115 under control of the CPU 101. Alternatively, all of the camera 112, microphone 114, and speaker 115 may be external devices.

Figure 4:
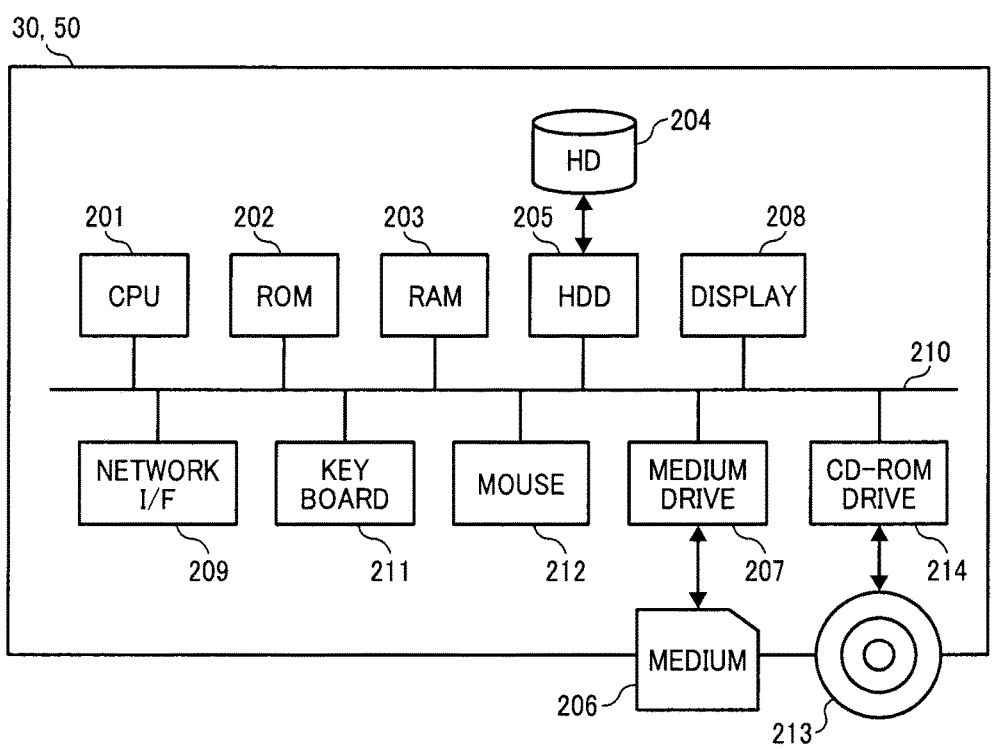
FIG. 4 is a schematic block diagram illustrating a hardware configuration of an information processing apparatus serving as a relay device or a communication management apparatus of FIG. 1.

Referring to FIG. 4, a hardware configuration of the relay device 30 and the management apparatus 50 is described according to the embodiment of the present invention. In this embodiment, the relay device 30 and the management apparatus 50 are each implemented by a general-purpose computer operating as a web server. For simplicity, the example case for the management apparatus 50 is described.

As illustrated in FIG. 4, the management apparatus 50 includes a CPU 201 that controls entire operation of the management apparatus 50, a ROM 202 that stores a control program for operating the CPU 201 such as an IPL, a RAM 203 that works as a work area for the CPU 201, a HD 204 that stores various data such as a communication management program, a HDD 205 that controls reading or writing of various data with respect to the HD 204 under control of the CPU 201, a medium drive 207 that controls reading or writing of various data with respect to a recording medium 206 such as a flash memory, a display 208 that displays various information, a network I/F 209 that controls transmission of data through the communication network 80, an input device such as a keyboard 211 and a mouse 212 for allowing the user to input an instruction, a CD-ROM drive 214 that controls reading or writing of various data with respect to a CD-ROM 213, and a bus line 210 that connects various elements of the management apparatus 50 such as an address bus or a data bus.

The relay device 30 is substantially similar to the management apparatus 50 except for the program stored in the memory for operating the relay device 30. More specifically, the HD 204 stores various data including a relay control program for controlling operation of the relay device 30, in alternative to the communication management program. Any one of the display 208, the keyboard 211, and the mouse 212 may not be provided in any one of the relay device 30 and the management apparatus 50.

Figure 5:
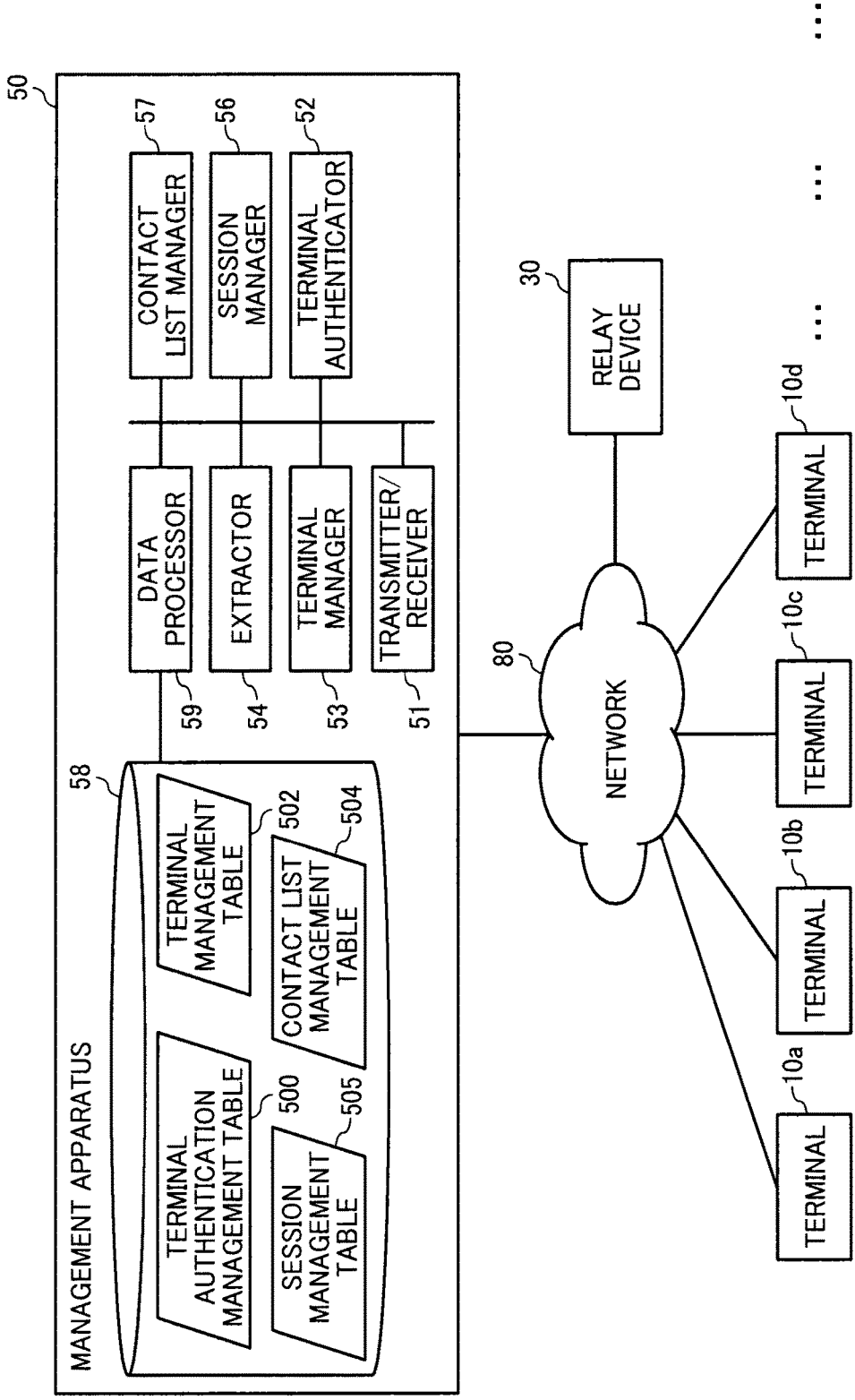
FIG. 5 is a schematic block diagram illustrating a functional configuration of the communication management apparatus of FIG. 4.

Referring now to FIG. 5, a functional configuration of the management apparatus 50 is described according to an embodiment of the present invention. As illustrated in FIG. 5, the management apparatus 50 includes a transmitter/receiver 51, a terminal authenticator 52, a terminal manager 53, an extractor 54, a session manager 56, a contact list manager 57, a data processor 59, and a memory 58.

The memory 58, which may be implemented by any desired memory of the management apparatus 50 such as the HD 204, stores a terminal authentication management table 500, terminal management table 502, contact list management table 504, and session management table 505.

The transmitter/receiver 51, which corresponds to the network I/F 209, transmits or receives various data to or from the terminal 10 and the relay device 30 through the communication network 80.

Figure 6:
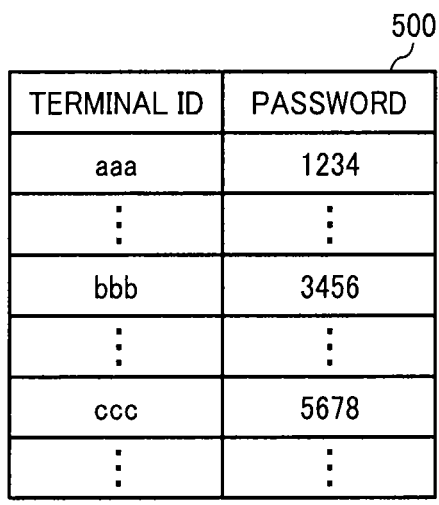
FIG. 6 is an illustration of an example data structure of a terminal authentication management table.

The terminal authenticator 52 is implemented by the instructions of the CPU 201. In response to receiving login request information from the terminal 10 at the transmitter/receiver 51, the terminal authenticator 52 searches the terminal authentication management table 500 (FIG. 6) in the memory 58 using a terminal ID and a password in the login request information as a search key. When the same pair of the terminal ID and the password are stored in the terminal authentication management table 500, the terminal authenticator 52 determines that the login terminal 10 is an authenticated terminal.

The terminal manager 53, which may be implemented by the instructions of the CPU 201, manages various information of the terminal 10, such as an operating state of the terminal 10. More specifically, the terminal manager 53 stores, in the terminal management table 502 (FIG. 7), the terminal ID of the terminal 10, the terminal name of the terminal 10, the operating state of the terminal 10, the date/time that the login request information is received at the management apparatus 50, and the IP address of the terminal 10 in association with one another.

For example, when the operating state information indicating turning off of the terminal 10 is received as the user turns off the power switch 109 (FIG. 3) of the terminal 10, the terminal manager 53 changes the operating state of the terminal 10 in the terminal management table 502 from "online" to "offline".

The extractor 54 may be implemented by the instructions of the CPU 201. For example, in response to receiving the login request information from the terminal 10, the extractor 54 searches the contact list management table 504 (FIG. 8) using the terminal ID of the terminal 10 that has requested to login ("request terminal"), to extract a terminal ID of each one of one or more candidates of counterpart terminals 10 that have been registered for the request terminal 10. In this embodiment, the contact list management table 504 is generated for the request terminal 10 based on approval from each one of candidate counterpart terminals 10 having an account on the remote conference system 1. Referring to FIG. 8, the contact list management table 504 stores the terminal ID of the request terminal, and the terminal ID of each one of one or more candidate counterpart terminals 10 that have approved to be listed in the contact list of the request terminal 10, in association with each other.

In response to receiving the login request information, the extractor 54 further searches the contact list management table 504 using the terminal ID of the request terminal 10 that has sent login request information as a search key to obtain the terminal ID of each one of one or more other terminals 10 that has registered the request terminal 10 as a candidate counterpart terminal.

The extractor 54 then searches the terminal management table 502 using the extracted terminal ID of each one of the candidate counterpart terminals 10 as a search key to obtain the operating state of the candidate counterpart terminal 10. The extractor 54 further searches the terminal management table 502 using the terminal ID of the request terminal 10 as a search key to obtain the operating state of the request terminal 10.

The session manager 56, which may be implemented by the instructions of the CPU 201, manages each session being established between or among the terminals 10 managed by the management apparatus 50, using the session management table 505 stored in the memory 58. For example, in establishing a session, the session manager 56 generates a session ID for identifying the session, and stores in association with terminal IDs of the terminals 10 that are participating in the session in the session management table 505. In case there is more than one relay device 30, the session manager 56 further stores a selected relay device 30 for relaying content data for the session, in association with the session ID identifying that session.

The contact list manager 57, which may be implemented by the instructions of the CPU 201, adds or deletes the terminal ID of the candidate counterpart terminal 10, which is stored in association with the request terminal 10 in the contact list management table 504, for example, according to an instruction from the terminal 10 operated by the user.

The data processor 59, which may be implemented by the instructions of the CPU 201, stores or reads various data to or from the memory 58.

Figure 9:
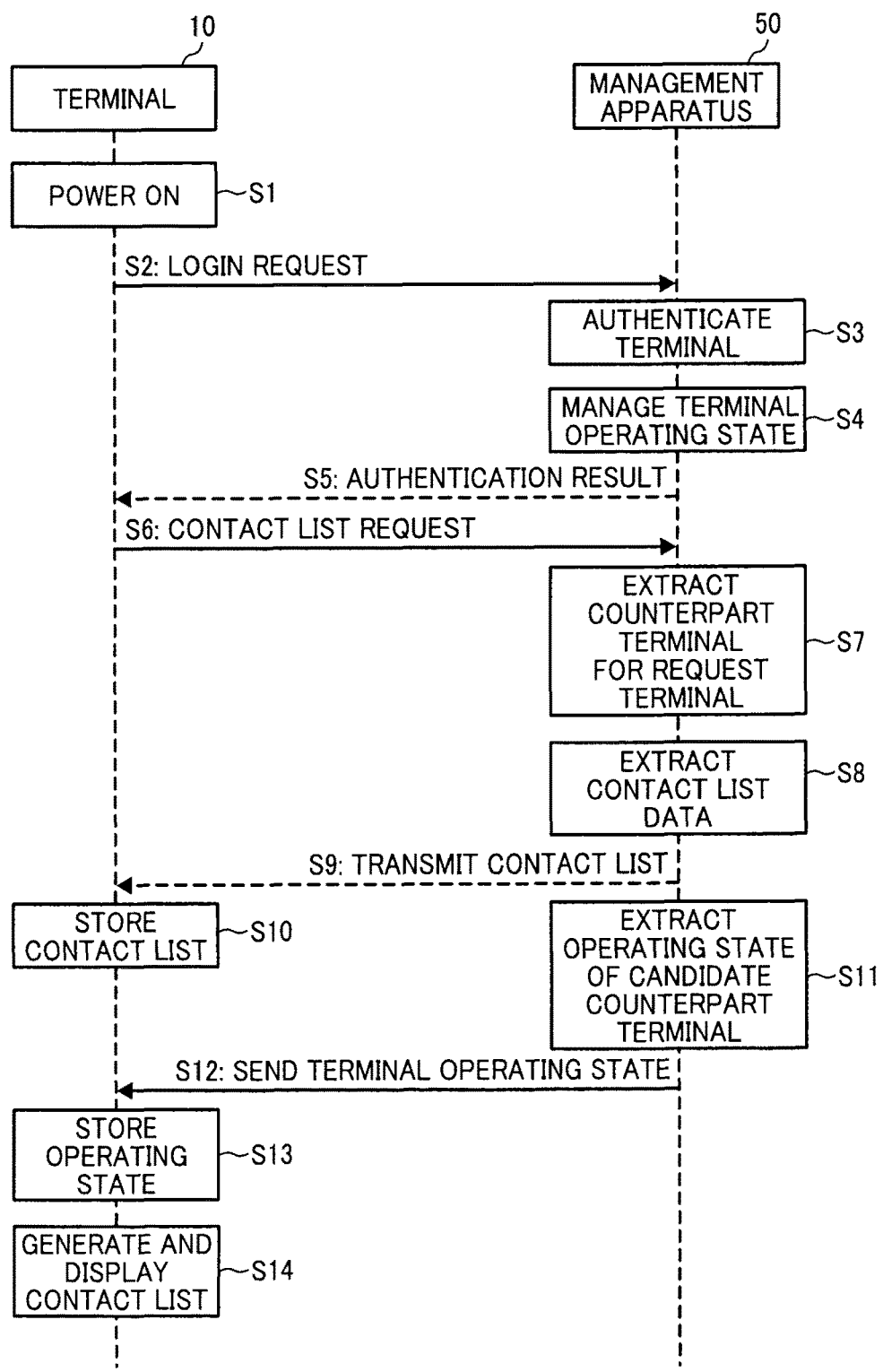
FIG. 9 is a data sequence diagram illustrating operation of processing a login request from the communication terminal, according to an embodiment of the present invention.

Referring to FIG. 9, operation of processing a request for logging in the remote conference system 1 to participate in videoconference, performed by the terminal 10 and the management apparatus 50, is described according to an embodiment of the present invention.

As the user turns on the power switch 109 (FIG. 3) of the terminal 10, at S1, the terminal 10 is turned on. In response to turning on of the terminal 10, at S2, the transmitter/receiver 11 of the terminal 10 transmits login request information including the terminal ID of the terminal 10 and the password, to the management apparatus 50 through the communication network 80. Together with the login request information, the terminal 10 sends an IP address of the terminal 10 to the management apparatus 50. For simplicity, the terminal 10 requesting for logging in may be referred to as the request terminal 10.

At S3, the terminal authenticator 52 of the management apparatus 50 searches the terminal authentication management table 500 (FIG. 6) using the terminal ID and the password in the login request information as a search key to determine whether the same pair of the terminal ID and the password is stored for terminal authentication. When authentication is successful, at S4, the terminal manager 53 stores, in association with the terminal ID and the terminal name of the login terminal in the terminal management table 502 (FIG. 8), the operating state, the date/time at which the login request information is received, and the IP address of the request terminal 10. At S5, the terminal authenticator 52 transmits an authentication result to the request terminal 10 through the transmitter/receiver 51. In this example, the authentication result indicating that the authentication is successful is sent.

At S6, the request terminal 10, which receives the authentication result (successful), transmits a contact list request to the management apparatus 50. In response to the contact list request, at S7, the extractor 54 of the management apparatus 50 searches the contact list management table 504 (FIG. 8) using the terminal ID of the request terminal 10 requesting for contact list as a search key to extract the terminal ID of each one of the candidate counterpart terminals 10 stored in association with the request terminal 10 requesting for contact list. At S7, the extractor 54 further extracts the terminal name associated with each one of the extracted terminal IDs of the candidate counterpart terminals 10 from the terminal management table 502 (FIG. 7).

At S8, the data processor 59 of the management apparatus 50 reads contact list data for generating a contact list frame from the memory 58. At S9, the transmitter/receiver 51 of the management apparatus 50 transmits the contact list data to the request terminal 10, together with the terminal IDs and the terminal names of the candidate counterpart terminals 10 that are extracted at the extractor 54, as contact list information ("contact list" in FIG. 9). At S10, the request terminal 10, which receives the contact list information, stores the received contact list information in the memory such as the flash memory 104.

At S11, the extractor 54 of the management apparatus 50 searches the terminal management table 502 (FIG. 7) using the terminal IDs of the candidate counterpart terminals 10 that are extracted at S6, to obtain the operating state of each one of the candidate counterpart terminals 10.

At S12, the transmitter/receiver 51 of the management apparatus 50 transmits terminal operating state information, which includes the terminal IDs of the candidate counterpart terminals 10 and the operating states of the candidate counterpart terminals 10, to the request terminal 10 requesting for contact list.

At S13, the request terminal 10 stores the terminal operating state information in the memory such as the flash memory 104.

At S14, the request terminal 10 generates a contact list that reflects the operating state of each one of the candidate counterpart terminals 10, based on the contact list information and the terminal operating state information that are stored in the memory. The request terminal 10 further displays the contact list on the display 120, for example, as illustrated in FIG. 10.

From the contact list being displayed on the display 120, the user at the request terminal 10 selects one or more of the candidate counterpart terminals 10 as a counterpart terminal to start communication with. In response to selection of the counterpart terminal 10, the management apparatus 50 allows transmission or reception of content data between the request terminal 10 and the selected counterpart terminal 10. In case the selected counterpart terminal 10 is communicating with the other terminal 10, the management apparatus 50 allows transmission or reception of content data between the request terminal 10 and the selected counterpart terminal 10, as well as between the request terminal 10 and the other terminal 10 that is communicating with the selected counterpart terminal 10.

Referring to FIG. 11, a functional configuration of the terminal 10 and the relay device 30 is described according to the embodiment of the present invention. While the configuration of the terminal 10a is illustrated in FIG. 1, any other terminal 10 has a functional configuration that is substantially similar to that of FIG. 1. Further, in this example referring to FIG. 11, any terminal 10b, 10c, or 10d may be referred to as a counterpart terminal 10 communicating with the terminal 10a via the relay device 30.

As illustrated in FIG. 11, the terminal 10a includes a code quantity change requester 12, a code quantity changer 13, an output time updater 14, a CPU usage rate obtainer 16, and a communication speed obtainer 17, each of which are implemented by the instructions of the CPU 201 according to the control program stored in the memory. The terminal 10a further includes a transmitter/receiver 15, which corresponds to the network I/F 209, and an output state management table 700 stored in the memory.

The code quantity change requester 12 generates and transmits a request for reducing a code quantity of content data ("code quantity change request"), to the counterpart terminal 10 that sends the content data, based on detection of a delay in output of such content data. The content data subject for detection of a delay may be previously selected by the user.

The code quantity changer 13 reduces the code quantity of content data for transmission to the counterpart terminal 10, in response to a code quantity change request transmitted from the counterpart terminal 10.

The output time updater 14 updates an output time when an output signal of the content data selected by the user is output, for example, every time an output signal of such content data is output.

The transmitter/receiver 15 transmits or receives various data to or from the counterpart terminal 10 through the relay device 30.

The CPU usage rate obtainer 16 obtains a CPU usage rate of the CPU 101.

The communication speed obtainer 17 obtains a communication speed of the terminal 10a.

Still referring to FIG. 11, the relay device 30 includes a relay controller 32, and a change request log manager 34, which may be implemented by the instructions of the CPU 201 according to the relay device control program stored in the memory. The relay device 30 further includes a change request log management table 600 stored in the memory.

The relay controller 32 transfers various data received from the terminal 10a to a destination such as the counterpart terminal 10, or various data received from the counterpart terminal 10 to the terminal 10a. The change request log manager 34 manages a log of code quantity change requests that have been received from each one of the terminals 10 (including the terminals 10a, 10b, 10c, etc.) that the relay device 30 manages relaying of content data.

In this embodiment, the relay controller 32 determines a code quantity change request to be transmitted, based on the code quantity change requests. For example, when more than one code quantity change request is received for the same content data, the relay controller 32 determines contents of a code quantity change request to be transmitted.

Referring to FIG. 12, operation of processing registration of content data subjected for transmission control is described according to an embodiment of the present invention. More specifically, in this embodiment, the user at the terminal 10a is able to select specific content data (or specific type of content data) that the user wants to receive from the counterpart terminal 10 without delay.

As described above referring to FIG. 9, the user at the terminal 10a starts communicating with the counterpart terminals 10b, 10c, 10d, etc., as the user selects the counterpart terminals 10b, 10c, 10d, etc., from the contact list. More specifically, the relay device 30 establishes a content data session Sd with each one of the terminals 10a, 10b, etc., to relay content data among the participating terminals 10. At any time during the communication, the user at the terminal 10a may instruct the terminal 10a for an input screen for registering or deleting content data subjected for transmission control.

In response to such user instruction, the terminal 10a displays on the display 120 an input screen for registering or deleting content data subjected for transmission control. Here, the example case for requesting registration of content data is described.

As the user at the request terminal 10a instructs to display an input screen for registering content data, at S11, the terminal 10a transmits a request for an input screen for registering content data ("content data registration request") to the relay device 30.

At S12, the relay device 30 assigns a data ID to each one of a plurality of items of content data being relayed by the relay device 30 for the currently-established content data session Sd. This data ID uniquely identifies each data at least within a conference (that is, the content data session Sd) that the request terminal 10a is participating. The relay device 30 generates content data registration data, which is a list of data IDs and data names of content data available for registration for the current session. For the data name, a type of content data such as whether the content data is image or audio may be used.

At S13, the management apparatus 50 transmits the content data registration data to the terminal 10a, in response to the request for an input screen.

Figure 13A:
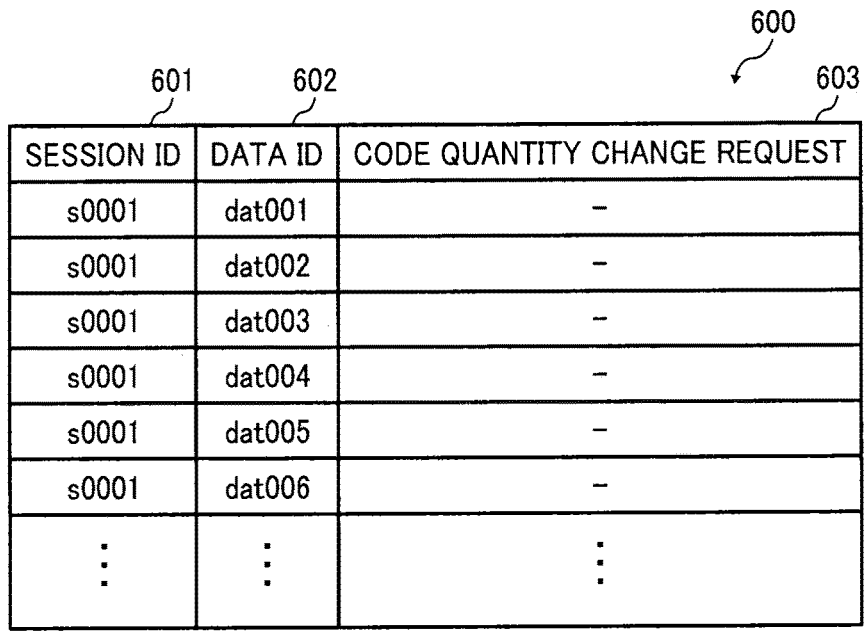
FIGS. 13A and 13B are an illustration of an example data structure of a change request management table.

At S14, the relay device 30 generates a change request log management table 600 of FIG. 13A, or if such table has been generated, updates contents of the change request log management table 600 to additionally include a record for the current session. Referring to FIG. 13A, the change request log management table 600 includes, for each one of a plurality of sessions being established by the relay device 30, a field 601 for storing a session ID of the session, a field 602 for storing a data ID of content data being relayed for the session, and a field 603 for storing contents of a code quantity change request received for the content data. As illustrated in FIG. 13A, the table 600 may list more than one data ID if there is more than one file of content data (such as image data and audio data), if such content data is being relayed through that session. For example, for the session with the session ID "s0001", six content data IDs "dat001" to "dat006" are listed. The change request log management table 600 may further include a transmission source of the associated content data. S14 may be performed prior to S13, or concurrently with S13.

Figure 14A:
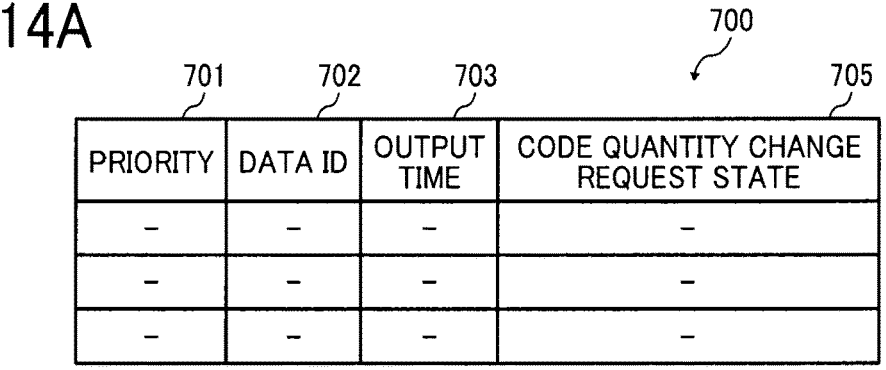
FIGS. 14A to 14D are an illustration of an example data structure of an output state management table.

In response to receiving the content data registration data from the relay device 30 at S13, the code quantity change requester 12 of the terminal 10a generates an output state management table 700 of FIG. 14A. Referring to FIG. 14A, the output state management table 700 includes, for content data being relayed for the currently-established session, a field 701 for storing priority assigned to the content data, a field 702 for storing a data ID of the content data, a field 703 for storing output time indicating the last time when an output signal of the content data has been output, and a field 705 for storing a state of a code quantity change request. Since the user has not selected any of content data in this example, all of the fields in the output state management table 700 are left blank.

At S16, the terminal 10aa causes the display 120 to display a data selection screen, which lists content data to be received at the terminal 10a for the session that the terminal 10a is currently participating, based on the content data registration data received from the relay device 30. Through this data selection screen, the user at the terminal 10a is able to select at least one file of content data to be output without delay, while setting priority. For example, if the user prefers to hear what the other participant has spoken during the conference, the user selects the audio data for transmission control with the highest priority. In this example referring to FIG. 14B, it is assumed that the user selects the content data "dat003" with highest priority of "1", the content data "dat002" with second highest priority of "2", and the content data "dat001" with lowest priority of "3".

Figure 14B:
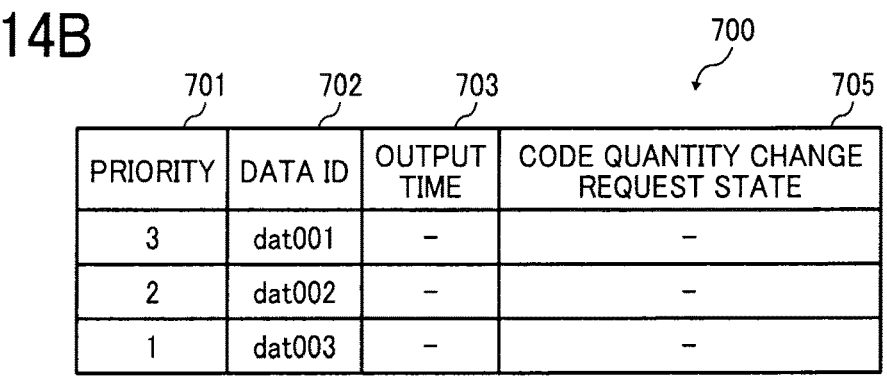

As illustrated in FIG. 14B, in response to a user input of the selected content data and priority, at S17, the code quantity change requester 12 enters a data ID of the selected content data into the field 702, and a priority of the selected content data into the field 701, of the output state management table 700.

The terminal 10a transmits or receives content data to or from the counterpart terminal 10 via the relay device 30. More specifically, the terminal 10a transmits content data, generated at the terminal 10a, to the counterpart terminal 10 (10b, 10c, 10d, etc.), through the relay device 30. The terminal 10a receives content data, generated at the counterpart terminal 10, from the counterpart terminal 10 through the relay device 30. In any of a packet of content data to be transmitted or received through the relay device 30, a unique data ID is included.

If a time that takes for the terminal 10a to output content data that is received from the counterpart terminal 10 becomes longer, the user at any terminal 10 feels delay in content data (such as image data or audio data), such that it would be difficult to smoothly carry out communication.

In view of this, in this embodiment, the remote conference system 1 suppresses a delay in outputting at least the content data that has been selected by the user (that is, the registered content data as described above), before the time in outputting the selected content data reaches a predetermined level that causes the user to feel delay in communication.

In this embodiment, the output time updater 14 of the terminal 10a constantly updates information indicating an output time when an output signal of the selected content data is output for the last time, to obtain an output time interval for the selected content data. Based on the output time interval, the terminal 10a detects a delay in outputting the selected content data.

First, operation of the output time updater 14 of the terminal 10a is described. The delay in outputting content data is mainly classified into "transmission delay" attributable to the trouble affecting the communication state of the communication network 80, and "internal processing delay" attributable to the trouble affecting the processing time for generating an output signal based on received data by the terminal 10a. Irrespective of a specific cause for delay, the delay in outputting content data can be detected based on a time period between the time when a current output signal is output and the time when the previous output signal is output for the content data. Accordingly, the output time updater 14 stores the output time when an output signal of the received content data has been output for the last time, in the field 703 of the update state management table 700, every time the output signal is newly output. In this way, the output time for the content data is constantly updated.

In this embodiment, in case the content data is image data, the latest output time is the time when the display I/F 118 instructs rendering of a decoded image frame onto a screen for display on the display 120. In case the content data is audio data, the latest output time is the time when the audio output IX 117 instructs outputting of a decoded audio frame through the speaker 115. The latest output time may be defined in various other ways, so as to reflect the time when the user actually sees the image on the display 120 or hears the audio through the speaker 115.

More specifically, in this embodiment, the output time updater 14 obtains the output time when the audio output I/F 117 (FIG. 11) outputs an audio signal generated based on audio data transmitted from the counterpart terminal 10, through the speaker 115 (FIG. 11). The output time updater 14 further stores the obtained output time in the field 703 associated with the data ID identifying that audio data, in the output state management table 700. In this manner, every time the audio signal is output, the output time updater 14 updates the value of output time. Further, the output time updater 14 obtains the output time when the display I/F 118 (FIG. 11) outputs an image signal generated based on image data received from the counterpart terminal 10 through the display 120 (FIG. 11). The output time updater 14 further stores the obtained output time in the field 703 associated with the data ID identifying that audio data, in the output state management table 700. In this manner, every time the image signal is output, the output time updater 14 updates the value of output time.

Figure 14C:
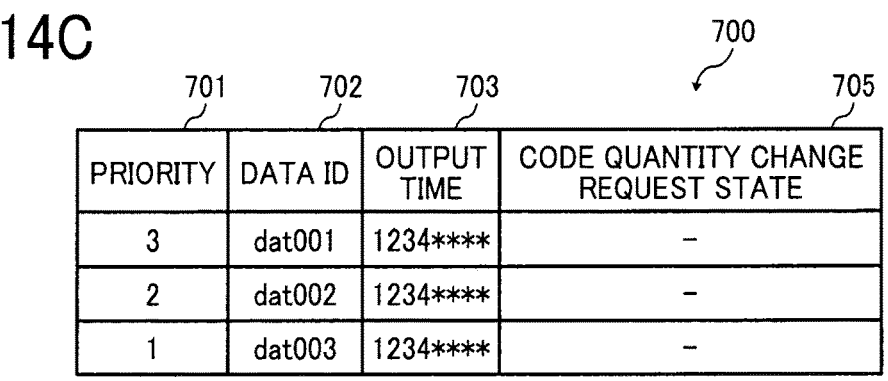

FIG. 14C illustrates the output state management table 700, after the terminal 10aa starts receiving at least the selected content data from the counterpart terminal 10 via the relay device 30, after registration of the selected content data. The output state management table 700 stores a latest output time in the field 703 associated the data ID for each of the selected content data.

Referring back to FIG. 12, operation of generating a code quantity change request is described according to the embodiment of the present invention.

At S18, the code quantity change requester 12 of the terminal 10a constantly monitors the value of output time that is constantly updated by the output time updater 14. When a delay in outputting the selected content data ("target content data") is detected, at S18, the code quantity change requester 12 generates a code quantity change request according to the degree of delay in outputting the target content data.

In this embodiment, the code quantity change requester 12 generates a code quantity change request, which includes a data ID of the target content data, an output delay factor, and a reduction coefficient.

Here, the "output delay factor" indicates either one of "transmission delay" or "internal processing delay". In generating the code quantity change request, the code quantity change requester 12 determines whether a network communication speed obtained by the communication speed obtainer 17 exceeds a predetermined threshold for network communication speed. When the obtained network communication speed is lower than the predetermined threshold, the code quantity change requester 12 determines that the delay factor for causing the delay is the "transmission delay", and generates the code quantity change request having the "transmission delay" value (referred to as the "Network") for the delay factor. In addition, the code quantity change requester 12 determines whether a CPU usage rate obtained by the CPU usage rate obtainer 16 exceeds a predetermined threshold for CPU usage rate. When the obtained CPU usage rate exceeds the predetermined threshold, the code quantity change requester 12 determines that the delay factor is the "internal processing delay", and generates the code quantity change request having the "internal processing delay" value (referred to as the "CPU") for the delay factor.

The "reduction coefficient" is a parameter defining a reduction level in code quantity, and is any real number equal to or greater than 1.0. In generating the code quantity change request, the code quantity change requester 12 calculates a reduction coefficient that sufficiently reduces the code quantity to solve the delay, for example, as described below.

At S19, the code quantity change requester 12 transmits the generated code quantity change request to the relay device 30 through the transmitter/receiver 15. In this example, the request may further include an identifier for identifying the counterpart terminal 10 that is transmitting such content data as a destination of the request, if such information is available to the terminal 10a. Such information may be extracted from, for example, attribute information of the content data. Alternatively, if such information is not included in the request, the relay device 30 may obtain the transmission source of the target content data from, for example, from the change request log table 600. At S20, the code quantity change requester 12 updates the output state management table 700.

In response to receiving the code quantity change request from the terminal 10a, at S21, the change request log manager 34 of the relay device 30 updates the change request log management table 600.

Figure 14D:
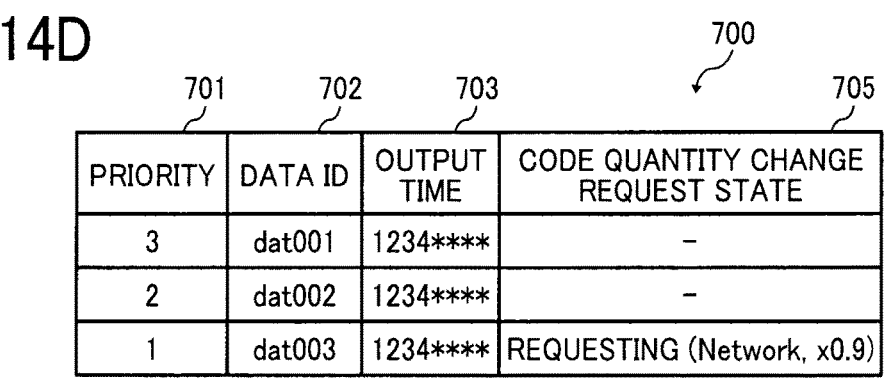

For example, it is assumed that the terminal 10a detects a delay in outputting the target content data "dat003", determines the delay factor "Network", and calculates the reduction coefficient "0.9". In such case, at S19, the code quantity change requester 12 of the terminal 10a transmits a code quantity change request, which includes the data ID "dat003" of the target content data, the terminal ID "aaa" of the terminal 10a, the delay factor "Network", and the reduction coefficient "0.9", to the relay device 30. At S20, the code quantity change requester 12 of the terminal 10a updates the output state management table 700 as illustrated in FIG. 14D. Referring to FIG. 14D, the field 705 for the data ID "dat003" stores a state value "REQUESTING", with the output delay factor "Network" and the reduction coefficient "0.9".

Figure 13B:
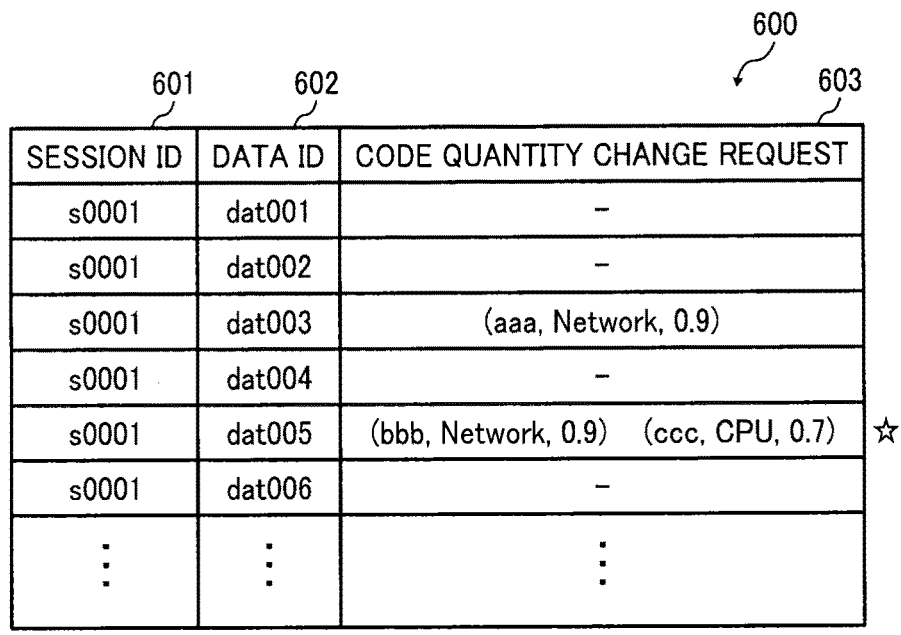

At S21, the change request log manager 34 of the relay device 30 updates the change request log management table 600 as illustrated in FIG. 13B. Referring to FIG. 13B, the change request log management table 600 stores, in the field 603 for the data ID "dat003", the "terminal ID "aaa" of the terminal 10a that sends the request, the output delay factor "Network", and the reduction coefficient "0.9" as specified by the received code quantity change request.

Referring back to FIG. 12, at S22, the relay controller 32 of the relay device 30 transfers the code quantity change request received from the terminal 10a to the counterpart terminal 10 that is transmitting the target content data with the data ID "dat003".

In response to receiving the code quantity change request from the relay device 30, at S23, the code quantity changer 13 of the counterpart terminal 10, as a source of the target content data, changes a code quantity of the target content data according to the received code quantity change request.

In the above-described example referring to FIG. 12, it is assumed that the user at the terminal 10a selects the content data for transmission control as well as priority. Alternatively, such information may be previously determined, for example, by the administrator of the system. Alternatively, the user may modify such information, which is previously set by the administrator, through inputting the user instruction as described above referring to FIG. 12.

Figure 15:
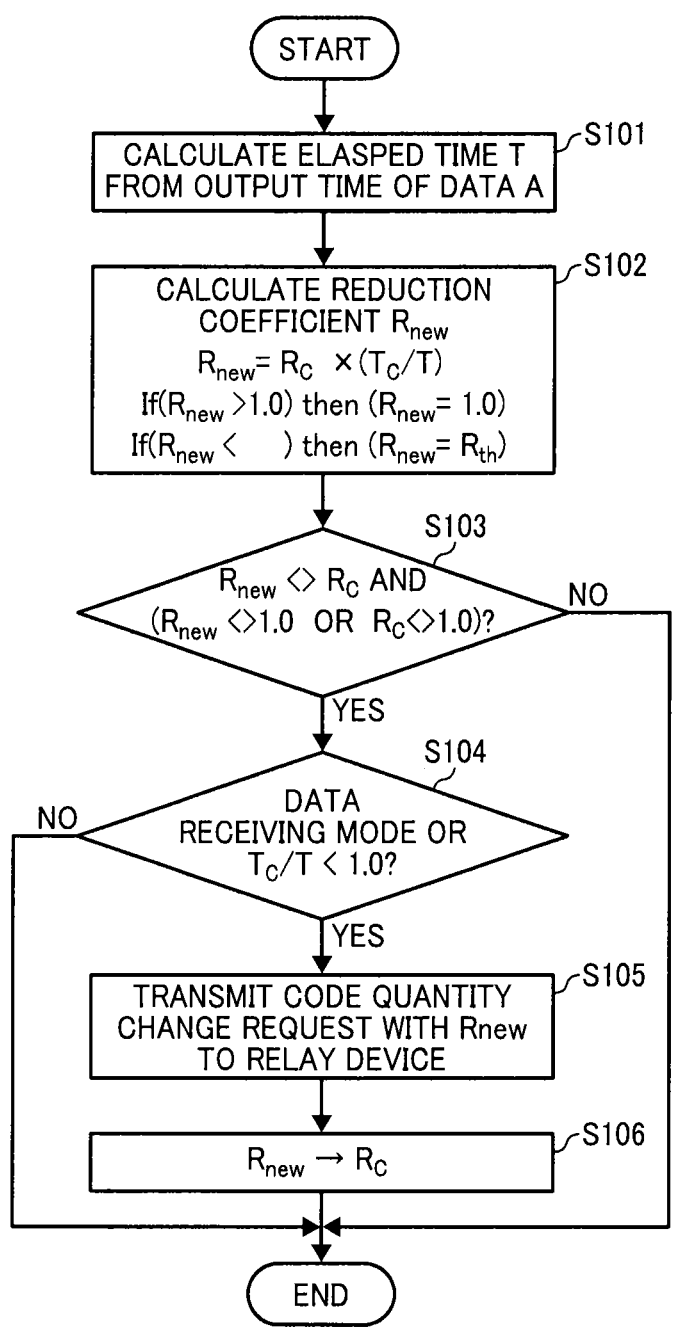
FIG. 15 is a flowchart illustrating operation of generating a code quantity change request, performed by the communication terminal, according to an embodiment of the present invention.
Figure 16A:
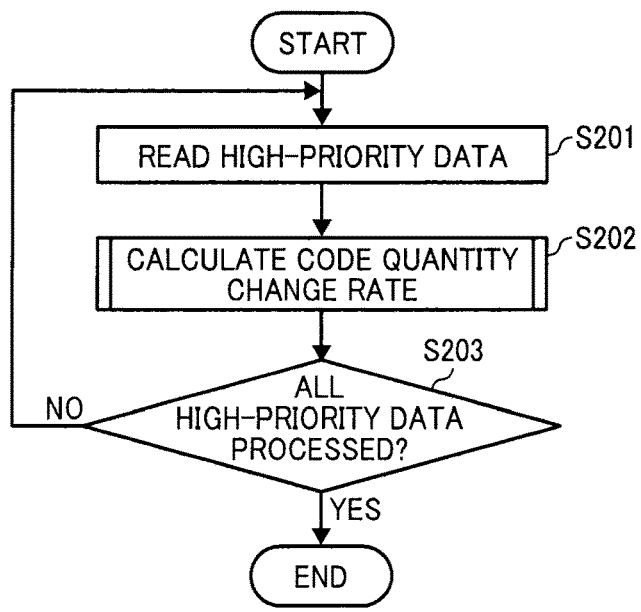
FIG. 16A is a flowchart illustrating operation of monitoring whether to generate a code quantity change request, periodically executed while a communication session is established, according to an embodiment of the present invention.
Figure 16B:
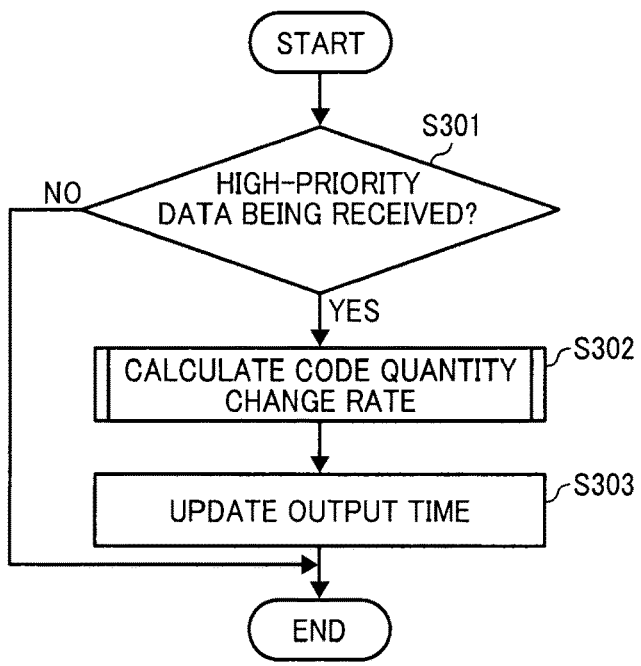
FIG. 16B is a flowchart illustrating operation of monitoring whether to generate a code quantity change request, executed in synchronization with output of content data, according to an embodiment of the present invention.

Referring to FIGS. 15, 16A, and 16B, operation of generating a code quantity change request, performed by the code quantity change requester 12 of the terminal 10a, is described according to the embodiment of the present invention.

FIG. 15 is a flowchart illustrating operation of calculating a code quantity change rate, performed by the code quantity change requester 12, during operation of FIG. 16A or FIG. 16B. As described later referring to FIG. 16A, operation of FIG. 15 is periodically performed while communication is being carried out through a content data session established by the terminal 10a ("periodic execution mode"). In addition to or in alternative to FIG. 16A, operation of FIG. 15 is performed when content data is received at the terminal 10a ("data receiving mode").

At S101, the code quantity change requester 12 calculates, for the target content data (in this example, the data "A"), an elapsed time period T counted between the latest output time and the current time. The latest output time is obtained from the field 703 of the output state management table 700.

At S102, the code quantity change requester 12 calculates a new reduction coefficient Rnew using the following equation (1).

$$Rnew = Rc * (Tc/T) \tag{1}$$

In the above equation (1), T denotes the elapsed time period calculated at S101. Rc denotes the current value of reduction coefficient specified according to the latest code quantity change request for the target content data. Tc denotes a reference output time period. Rc and Tc may be obtained from the memory of the terminal 10a.

The reference output time period Tc is a parameter that is previously set by data type. For example, Tc may be a theoretical value of output time period for a specific type of data with a predetermined margin added. For example, the theoretical output time period for the image data of 60 frames per second (fps) is 1/60 seconds=16.6 milliseconds (ms). Tc is set as 20 ms, which is obtained by adding the 20% margin to the theoretical output time period for the image data. The value of margin may be modified, for example, according to the user preference or according to the system in use.

In case the calculation result of S102 exceeds 1.0, Rnew is set to 1.0. Since the value 1.0 corresponds to the original code quantity, as long as Rnew is greater than 1.0, Rnew is set to 1.0. In case the calculation result of S102 is less than a predetermined threshold Rth, Rnew is set to Rth. Here, Rth is previously determined according to a reduction limit rate of data that is allowable by the remote conference system 1. For example, if the remote conference system 1 allows the reduction up to 1/10, Rth is set to 0.1.

At S103, the code quantity change requester 12 determines whether operation of reducing the code quantity is needed. More specifically, the code quantity change requester 12 determines whether the condition: Rnew obtained at S102 is not equal to Rc, and either Rnew or Rc is not equal to 1.0, is satisfied. When it is determined that the condition is not satisfied ("NO" at S103), the code quantity change requester 12 determines that there is no need to perform reduction, and the operation ends. In such case, since there is no need to reduce the code quantity, the code quantity change requester 12 does not generate or transmit the code quantity change request.

On the other hand, when it is determined that the condition is satisfied ("YES" at S103), the code quantity change requester 12 determines to perform reduction, and the operation proceeds to S104.

At S104, the code quantity change requester 12 determines whether to change the current reduction coefficient Rc to the new reduction coefficient Rnew. More specifically, the code quantity change requester 12 determines whether the condition: an execution mode, which is specified as described above referring to FIG. 16A or 16B, is the "data receiving mode", or the value "Tc/T" obtained at S102 is less than 1.0, is satisfied. When it is determined that the condition is not satisfied ("NO" at S104), the code quantity change requester 12 determines that there is no need to change the reduction coefficient, and the operation ends. In such case, since there is no need to change the reduction coefficient, which has been specified in the previously sent code quantity change request, the code quantity change requester 12 does not generate or transmit the code quantity change request.

On the other hand, when it is determined that the condition is satisfied ("YES" at S104), the code quantity change requester 12 determines to change the current reduction coefficient Rc to the new reduction coefficient Rnew, and the operation proceeds to S105.

When the specified execution mode is not the "data receiving mode", that is, the specified execution mode is the "periodic execution mode", the operation of FIG. 15 is performed periodically. In such case, the elapsed time "T" value may become less than the previously set Tc value, causing the calculation result of Rnew exceeding 1.0. However, this is not due to improvement in output state for outputting the content data. In such case, the operation ends based on the determination result of S104.

On the other hand, if the value "Tc/T" is equal to or greater than 1.0, that is, a delay in outputting content data is caused, the operation proceeds to S105 to try to improve the current state causing the delay in output, by sending a new code quantity change request.

At S105, the code quantity change requester 12 generates a code quantity change request, including the terminal ID of the terminal 10aa (local terminal), the data ID of the target data A, and the new reduction coefficient Rnew that is obtained at S102. The code quantity change requester 12 further transmits the generated code quantity change request to the relay device 30. In this example, the code quantity change requester 12 may additionally include the output delay factor.

At S106, the code quantity change requester 12 updates the field 704 for the data A in the output state management table 700 (FIG. 14) to change from the latest reduction coefficient Rc to the new reduction coefficient Rnew, and the operation ends.

The above-described operation of FIG. 15 may be periodically executed as described below referring to FIG. 16A while the terminal 10 is establishing a session with the relay device 30 (called "periodic execution mode"). In such case, at S201, the code quantity change requester 12 reads content data having a priority set higher than a predetermined threshold from the output state management table 700 (FIG. 14). The threshold for priority may be modified by the user.

At S202, the code quantity change requester 12 calls a subroutine, which corresponds to the operation of FIG. 15, for the high-priority content data read at S201.

At S203, the code quantity change requester 12 determines whether all of the high-priority content data in the output state management table 700 has been processed, and if NO, the operation repeats S201 and S202. If YES, the operation ends.

In this manner, operation of FIG. 15 is periodically performed for all high-priority content data.

Alternatively, while the content data is being received for output, as illustrated in FIG. 16B, the code quantity change requester 12 may perform the operation of FIG. 15 in synchronization with outputting of high-priority content data ("data receiving mode").

More specifically, in the case of image data, the code quantity change requester 12 executes operation of FIG. 15, at the time when a decoded frame of the received image data is rendered. In the case of audio data, the code quantity change requester 12 executes operation of FIG. 15, at the time when a decoded frame of received audio data is processed for output through the speaker.

At S301, the code quantity change requester 12 determines whether the content data selected for transmission control, which is high-priority content data, is being received at the terminal 10a. When the content data is being received ("YES" at S301), the operation proceeds to S302. Otherwise ("NO"), the operation ends.

At S302, the code quantity change requester 12 calls a subroutine, which corresponds to the operation of FIG. 15, for the high-priority content data being received for output.

At S303, the code quantity change requester 12 updates the value of output time for the content data A, and the operation ends.

Now, referring to FIG. 11, operation of the relay controller 32 of the relay device 30 is described according to the embodiment of the present invention. In the following, the terminal 10 that transmits content data is referred to as the transmission source terminal 10, and the terminal 10 that receives content data is referred to as the transmission destination terminal 10.

In the following, it is assumed that the relay device 30 receives the code quantity change request including the data ID "dat003", the terminal ID "aaa", the output delay factor "Network", and the reduction coefficient "0.9", from the terminal 10a operating as the transmission destination terminal 10. The change request log manager 34 of the relay device 30 stores in the field 603 for the data ID "dat003" of the change request log management table 600, the content "aaa, Network, 0.9" of the received code quantity change request.

As the change request log management table 600 is updated, the relay controller 32 reads the contents of the code quantity change request (aaa, Network, 0.9) in the field 603, and transfers the code quantity change request to the transmission source terminal 10 that transmits the content data "dat003".

Referring to FIG. 13B, as indicated by the "star" mark in the change request log management table 600, the relay device 30 may receive the change quantity change requests from two or more terminals 10 for the same content data during the session. In such case, the contents of the change quantity change requests may differ. In such case, the relay controller 32 generates the code quantity change request for the target content data as follows.

In case the code quantity change request with the "Network" delay factor, and the code quantity change request with the "CPU" delay factor are concurrently received for the same content data, the relay controller 32 selects the code quantity change request with the "CPU" delay factor. This selection is based on theory or empirical studies that, if there is the terminal subjected to the "transmission delay" and the terminal subjected to the "internal processing delay" for the same data, solving the "internal processing delay" observed at one terminal may eventually solve the "transmission delay" for the other terminal.

In another example, if there are a plurality of code quantity change requests having the same output delay factor value, the relay controller 32 generates the code quantity change request as follows.

If the reduction coefficients are identical among the plurality of code quantity change requests for the same content data, the relay controller 32 generates the code quantity change request having that same reduction coefficient. If the reduction coefficients are not identical among the plurality of code quantity change requests, the relay controller 32 selects one of the reduction coefficients as a representative reduction coefficient, to include such reduction coefficient in the code quantity change request. In one example, the greatest value of the reduction coefficients may be set as the representative reduction coefficient, so as to quickly improve the state of the terminal 10 that mostly suffers from the output delay. In another example, the average value of the reduction coefficients may be set as the representative reduction coefficient, so as to improve the state of each terminal 10 while not causing a sudden change for the user.

Now, operation of the code quantity changer 13 of the terminal 10 is described according to the embodiment of the present invention.

In response to receiving the code quantity change request from the relay device 30, the code quantity changer 13 of the terminal 10 changes a code quantity of the content data identified with the data ID of the change request, according to the output delay factor and the reduction coefficient in the change request.

In case the target content data is image data, the code quantity changer 13 performs the following.

For example, the code quantity changer 13 changes a resolution of the camera capturing the image data, so as to reduce the code quantity as specified by the reduction coefficient of the change request. More specifically, the code quantity changer 13 stops operating the camera, selects a resolution that is reduced to a level indicated by the reduction coefficient R, and re-starts the camera.

In case the reduction coefficient "0.25" is stated in the code quantity change request, the code quantity changer 13 changes the resolution of the camera to be almost half of the currently used resolution defined by height and width (in such case, the number of pixels will be ¼). The code quantity changer 13 reduces the size of image frame data, which is captured by the camera, before inputting the image frame data to an encoder.

In case the reduction coefficient "0.1" is stated in the code quantity change request, the code quantity changer 13 changes the resolution of the camera to be 0.316 (root of 0.1) of the currently used resolution.

In another example, in case the reduction coefficient "0.3" is stated in the code quantity change request, the code quantity changer 13 changes an encoded rate of the encoder to be 3/10 of the currently set value.

On the other hand, in case the target content data is audio data, the code quantity changer 13 may reduce a sampling rate of audio data so as to reduce the code quantity as specified by the reduction coefficient. For example, in case the reduction coefficient "0.5" is stated in the code quantity change request, the sampling rate is changed to ½ of the currently set value.

In case the output delay factor has the "CPU", the code quantity changer 13 preferably selects to reduce resolution, rather than changing setting of the encoder that may further increase the processing load for the decoder.

Figure 17:
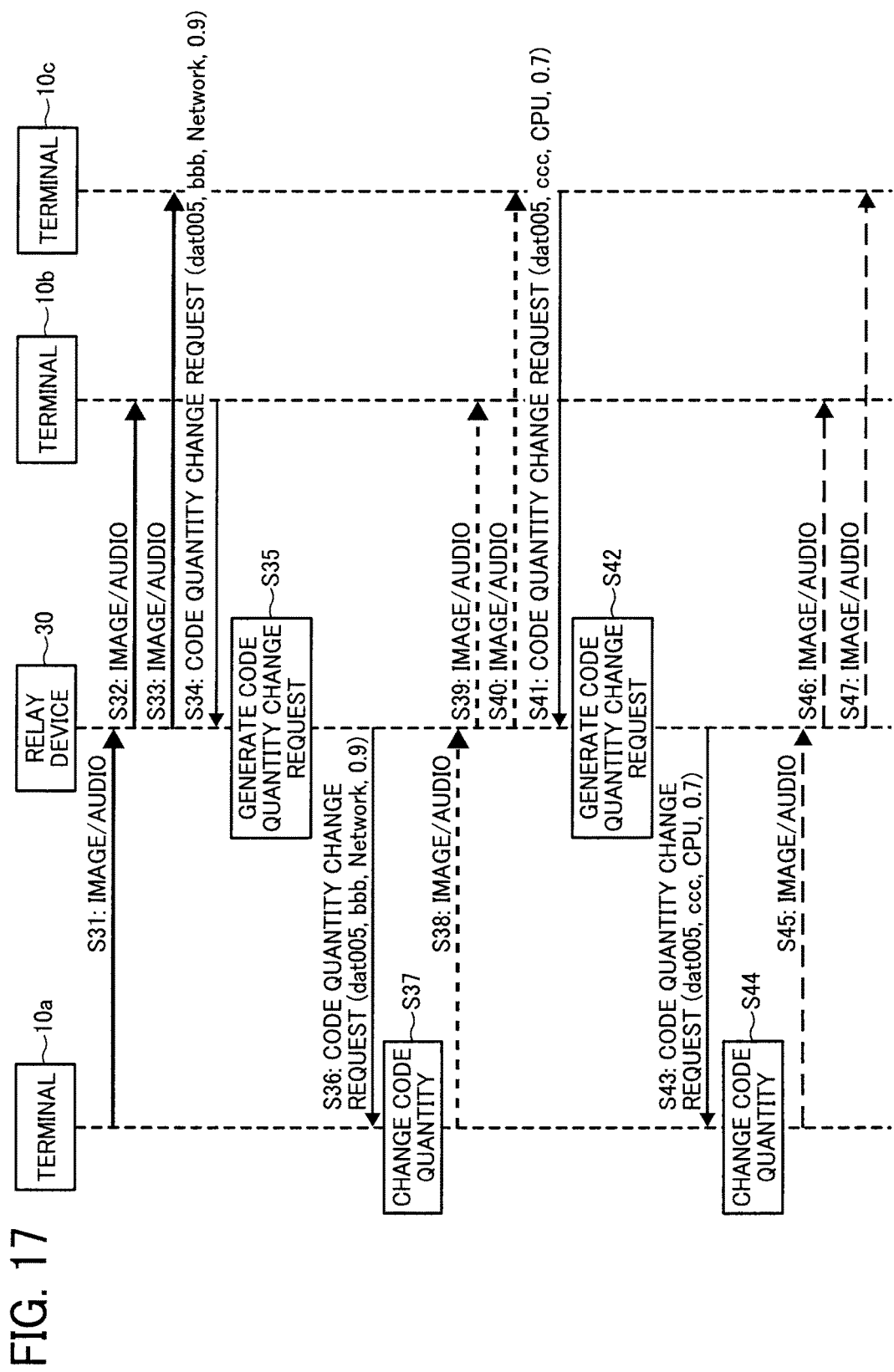
FIGS. 17 and 18 are a data sequence diagram illustrating operation of processing a request for changing code quantity, performed by the communication system of FIG. 1, according to an embodiment of the present invention.
Figure 18:
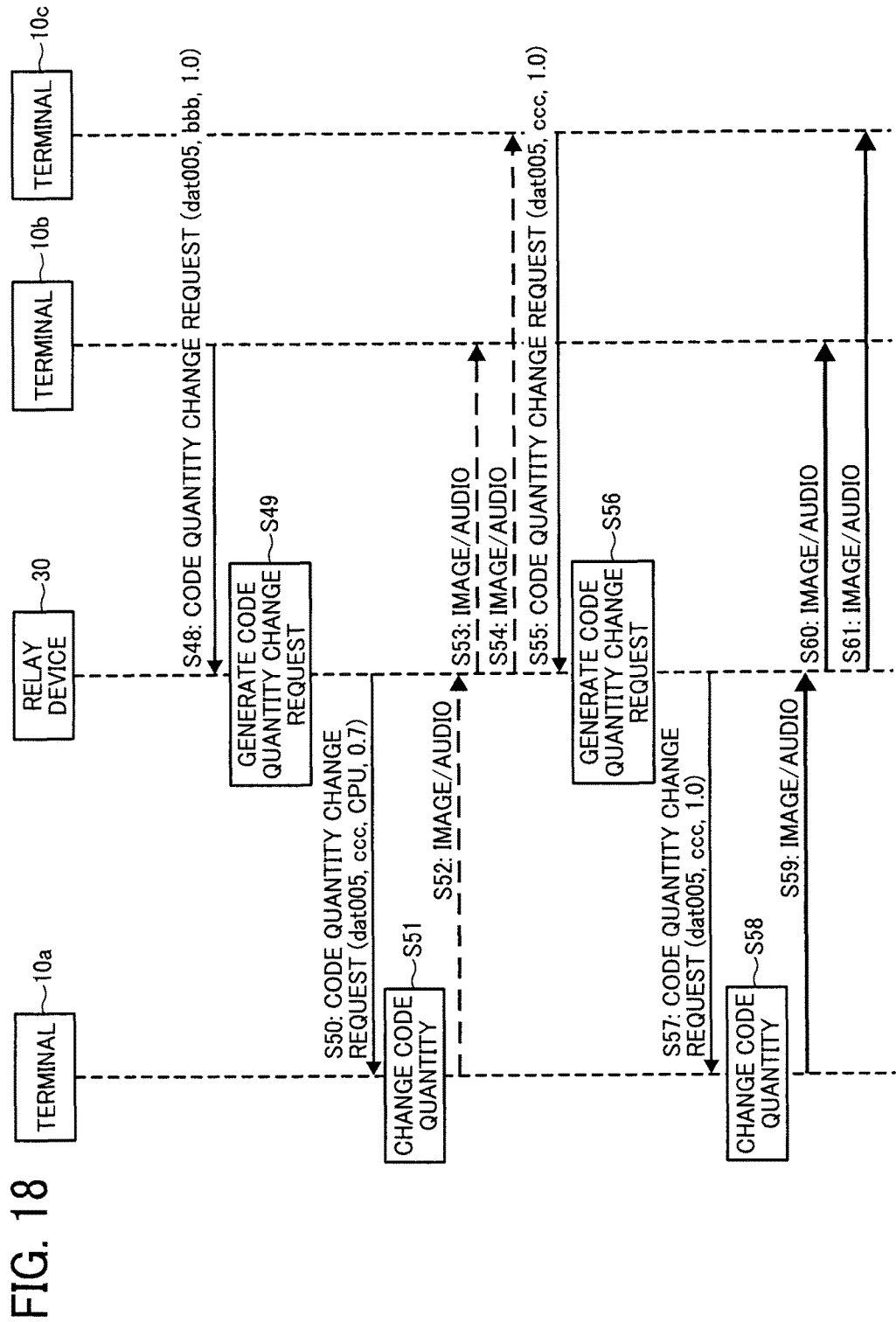

Referring to FIGS. 17 and 18, operation of controlling transmission of content data, performed by the remote conference system 1 is described, with a specific example. In this example, the terminals 10a, 10b, and 10c communicate with one another through the relay device 30.

At S31, the terminal 10a transmits content data (image data and audio data) addressed to the counterpart terminals 10b and 10c, to the relay device 30. At S32 and S33, the relay device 30 transmits the received content data to the counterpart terminal 10b and the counterpart terminal 10c, respectively.

Assuming that the terminal 10b detects a delay in outputting the content data (image data) "dat005", at S34, the terminal 10b transmits a code quantity change request for the content data "dat005" received from the terminal 10a to the relay device 30. The code quantity change request includes the data ID "dat005" of the target content data, the terminal ID "bbb" of the terminal 10b, the output delay factor "Network", and the reduction coefficient "0.9".

At S35, the relay controller 32 of the relay device 30 performs operation of generating the code quantity change request. Since only one change request has been received for the content data "dat005", the relay device 30 generates the code quantity change request including the data ID "dat005", the terminal ID "bbb", the output delay factor "Network", and the reduction coefficient "0.9". At S36, the relay controller 32 of the relay device 30 transmits the generated code quantity change request to the terminal 10a, through the network I/F 209.

At S37, the code quantity changer 13 of the terminal 10a reduces the encoding rate for the image data "dat005" to 9/10 of the currently set value, based on the code quantity change request.

At S38, the terminal 10a transmits the image data, which is encoded with the changed encoding rate, to the relay device 30, together with the audio data. At S39 and S40, the relay device 30 transmits the received content data to the counterpart terminal 10b and the counterpart terminal 10c, respectively.

Assuming that the terminal 10e now detects a delay in outputting the content data "dat005", at S41, the terminal 10c transmits a code quantity change request for the content data "dat005" transmitted from the terminal 10a, to the relay device 30. The code quantity change request includes the data ID "dat005", the terminal ID "ccc", the output delay factor "CPU", and the reduction coefficient "0.7".

At S42, the relay device 30 generates a code quantity change request. In this case, the change request log management table 600 (FIG. 13) now stores two different code quantity change requests, which are received at S34 and S42. As described above, the relay controller 32 of the relay device 30 selects the code quantity change request with the delay factor "CPU". At S43, the relay controller 32 of the relay device 30 transmits the code quantity change request, which is received from the terminal 10c, to the terminal 10a.

The terminal 10a receives the code quantity change request (dat005, ccc, CPU, 0.7), which differs than the code quantity change request that has been previously received. At S44, the terminal 10a changes the encoding rate of the encoder back to a default value, and further reduces the resolution of image data to be input to the encoder. At S45, the terminal 10a transmits the image data with lower resolution, together with audio data, to the relay device 30. At S46 and S47, the relay device 30 transmits the image data and the audio data to the counterpart terminal 10b and the counterpart terminal 10c, respectively.

This improves output of the image data "dat005" at the terminal 10b, and the Re value becomes 1.0.

Referring to FIG. 18, at S48, the terminal 10b transmits the code quantity change request (dat005, bbb, 1.0) to the relay device 30.

At S49, the relay controller 32 of the relay device 30 generates a code quantity change request. Since the reduction coefficient of the code quantity change request for the data "dat005" is "1.0", the relay device 30 determines that there is no need to control operation according to the code quantity change request from the counterpart terminal 10b, and cancels the request from the terminal 10b. At S50, the relay device 30 transmits only the code quantity change request (dat005, ccc, CPU, 0.7), which is stored in the change request log table 600, to the terminal 10a.

At S51, the terminal 10a, which receives the code quantity change request (dat005, ccc, CPU, 0.7), determines that the code quantity change request has the contents that are the same as that of the code quantity change request being stored. In such case, the code quantity change requester 21 does not change the code quantity.

At S52, S53, and S54, quality of the image data transmitted from the terminal 10a to the terminal 10b and the terminal 10c through the relay device 30 is kept unchanged.

As the outputting of image data "dat005" is improved at the terminal 10c, the value of Rc is changed to 1.0. Accordingly, at S55, the terminal 10c transmits a code quantity change request (dat005, ccc, 1.0) to the relay device 30.

At S56, the relay device 30 generates a code quantity change request. Since the reduction coefficient in the code quantity change request for the data "dat005", which is received from the terminal 10c, is "1.0", the relay device 30 determines that there is no need to control operation according to the code quantity change request from the counterpart terminal 10c. At S57, the relay device 30 transmits the code quantity change request (dat005, ccc, 1.0), which is only the request stored in the change request log table 600 for the data "dat005", to the terminal 10a.

At S58, the terminal 10a, which receives the code quantity change request (dat005, ccc, 1.0), changes the resolution of the image data "dat005" back to a default value. At S59, the terminal 10a transmits the image data having the default resolution value, together with the audio data, to the relay device 30. At S60 and S61, the relay device 30 transmits the image data and the audio data to the counterpart terminals 10b and the counterpart terminal 10c, respectively.

As described above, the terminal 10 as a destination of content data, dynamically calculates a reduction rate in content data being received according to detected delay in outputting such content data. Based on a request from the transmission destination terminal 10, the terminal 10 as a source of content data reduces a code quantity of the content data to be transmitted to the requested terminal 10.

For example, content data for the above-described transmission control may be previously set. At least for such content data to be output with higher priority, the terminal 10 outputs the content data without delay.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, in alternative to the above-described remote conference system, the above-described embodiment may be applied to any desired communication system capable of transmitting content data via a communication network. Further, the terminal may be implemented by a smartphone, general-purpose PC, tablet terminal, portable phone, electronic whiteboard, projector, car navigation system, etc.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Further, any one of the above-described control programs may be written in any language such as C, C++, C#, and Java. Any of such control programs may be stored in a readable recording medium such as a hard disk, CD-ROM, MO, DVD, flexible disk, EEPROM, or EEPROM, or may be distributed over a network.

Furthermore, the management apparatus 50 is only illustrative of one of several computing environments for implementing the embodiments disclosed herein. For example, in some embodiments, the management apparatus 50 includes a plurality of computing devices, e.g., a server cluster, that are configured to communicate with each other over any type of communications link, including a network, a shared memory, etc. to collectively perform the processes disclosed herein. Similarly, the relay device 30 can include a plurality of computing devices that are configured to communicate with each other.

Moreover, the illustrated elements of the management apparatus 50 and the relay device 30 can be combined into a single server apparatus, or divided between a plurality of machines in combinations other than that shown for example in FIGS. 5 and 11.

The invention claimed is:

1. A communication terminal, comprising:
a receiver configured to receive content data from one or more counterpart communication terminals through a network;
an output interface configured to output a plurality of output signals based on the content data being received from the one or more counterpart communication terminals;
circuitry configured to
    determine whether a delay in output of an output signal based on first content data is detected, the first content data being received at the receiver from a first counterpart communication terminal, and
    generate a first request for changing a code quantity of the first content data being received based on a determination indicating that the delay is detected, the first request including a reduction coefficient for determining an amount of reduction in the code quantity of the first content data being received; and
a transmitter configured to transmit the first request to the first counterpart communication terminal that transmits the first content data, through the network,
wherein:
when the receiver receives a second request for changing a code quantity of second content data to be transmitted to a second counterpart communication terminal from the second counterpart communication terminal through the network, the second request including a reduction coefficient for determining an amount of reduction in the code quantity of the second content data to be transmitted, and
the circuitry is further configured to reduce the code quantity of the second content data according to the reduction coefficient of the second request.

2. The communication terminal of claim 1, wherein the circuitry obtains an output time interval indicating a time period counted from a last time when an output signal is previously output based on the first content data being received, and determines that the delay is detected when the obtained output time interval exceeds a predetermined threshold.

3. The communication terminal of claim 1, wherein the circuitry calculates the reduction coefficient based on a ratio of the output time interval for the first content data being received to a reference output time interval.

4. The communication terminal of claim 1, further comprising:
a user interface configured to receive a user selection of the first content data from a plurality of items of content data being received from the one or more counterpart communication terminals,
wherein the circuitry determines whether a delay is detected for the first content data selected by the user.

5. The communication terminal of claim 1, wherein the circuitry determines whether a delay is detected for at least the first content data, periodically during when the communication terminal establishes a communication session with the first counterpart terminal.

6. The communication terminal of claim 1, wherein the circuitry determines whether a delay is detected for the first content data, in synchronization with a time for outputting the output signal of the first content data being received, while the first content data is being received at the receiver.

7. The communication terminal of claim 1, wherein, based on the determination indicating that the delay is detected, the circuitry determines an output delay factor, based on a network communication speed of the communication terminal and a central processing unit (CPU) usage rate of the communication terminal, and causes the first request to include the determined output delay factor.

8. The communication terminal of claim 1, wherein the second request further includes an output delay factor causing the delay in outputting the second content data at the second counterpart communication terminal, and
the circuitry determines a method of reducing the code quantity of the second content data according to the output delay factor of the second request.

9. The communication terminal of claim 1, wherein the content data includes at least one of image data to be output through a display and audio data being output through a speaker.

10. A communication system, comprising:
the communication terminal of claim 1; and
a relay device configured to relay content data between the communication terminal and the one or more counterpart communication terminals, the relay device including:
a memory to store request information associating an identifier identifying each one of a plurality of items of content data being relayed and one or more requests for changing a code quantity of the content data that are received from the one or more of the plurality of communication terminals for the content data; and
circuitry configured to update the request information so as to include the first request in response to receiving the first request for changing a code quantity of the first content data from the communication terminal.

11. The communication system of claim 10, wherein, when at least one request for changing a code quantity is stored for the first content data other than the first request received from the communication terminal, the circuitry of the relay device selects one request for changing a code quantity of the first content data for transmission to the first counterpart communication terminal.

12. A method of controlling output of content data at a communication terminal, the method comprising:
determining whether a delay in output of an output signal based on first content data is detected, the first content data being received at the communication terminal from a first counterpart communication terminal through a network;
generating a first request for changing a code quantity of the first content data being received based on a determination indicating that the delay is detected, the first request including a reduction coefficient for determining an amount of reduction in the code quantity of the first content data being received;
transmitting the first request to the first counterpart communication terminal that transmits the first content data, through the network;
receiving a second request for changing a code quantity of second content data to be transmitted to a second counterpart communication terminal, from the second counterpart communication terminal through the network, the second request including a reduction coefficient for determining an amount of reduction in the code quantity of the second content data to be transmitted; and
reducing the code quantity of the second content data according to the reduction coefficient of the second request.

13. The method of claim 12, further comprising:
receiving a user selection of the first content data from a plurality of items of content data being received from one or more counterpart communication terminals,
wherein the determining includes determining whether a delay is detected for the first content data selected by the user.

14. The method of claim 12, wherein, when the determining determines that the delay is detected, the method further comprising:
determining an output delay factor, based on a network communication speed of the communication terminal and a central processing unit (CPU) usage rate of the communication terminal; and
causing the first request to include the determined output delay factor.

15. A non-transitory recording medium which, when executed by one or more processors, cause the processors to perform a method of controlling output of content data at a communication terminal, the method comprising:
determining whether a delay in output of an output signal based on first content data is detected, the first content data being received at the communication terminal from a first counterpart communication terminal through a network;
generating a first request for changing a code quantity of the first content data being received based on a determination indicating that the delay is detected, the first request including a reduction coefficient for determining an amount of reduction in the code quantity of the first content data being received;
transmitting the first request to the first counterpart communication terminal that transmits the first content data, through the network;
receiving a second request for changing a code quantity of second content data to be transmitted to a second counterpart communication terminal, from the second counterpart communication terminal through the network, the second request including a reduction coefficient for determining an amount of reduction in the code quantity of the second content data to be transmitted; and reducing the code quantity of the second content data according to the reduction coefficient of the second request.

* * * * *